US006963555B1

(12) United States Patent
Brenner, II et al.

(10) Patent No.: US 6,963,555 B1
(45) Date of Patent: Nov. 8, 2005

(54) METHOD AND SYSTEM FOR AUTHORIZATION, ROUTING, AND DELIVERY OF TRANSMISSIONS

(75) Inventors: Robert W. Brenner, II, Alpharetta, GA (US); Kenneth W. Hammer, Lutz, FL (US)

(73) Assignees: GTE Mobilnet Service Corporation, New York, NY (US); GTE Telecommunication Services Incorporated, Tampa, FL (US)

( * ) Notice: Subject to any disclaimer, the term of this patent is extended or adjusted under 35 U.S.C. 154(b) by 0 days.

(21) Appl. No.: 09/026,903

(22) Filed: Feb. 20, 1998

(51) Int. Cl.⁷ .............................................. H04L 12/28
(52) U.S. Cl. ....................................... 370/351; 370/401
(58) Field of Search ................................ 370/351, 352, 370/384, 385, 410, 522, 238, 338, 401, 402; 455/432.1, 435.1

(56) References Cited

U.S. PATENT DOCUMENTS

| | | | |
|---|---|---|---|
| 5,014,206 A | 5/1991 | Scribner et al. | 364/449 |
| 5,043,736 A | 8/1991 | Darnell et al. | 342/357 |
| 5,119,102 A | 6/1992 | Barnard | 342/357 |
| 5,155,689 A | 10/1992 | Wortham | 364/460 |
| 5,223,844 A | 6/1993 | Mansell et al. | 342/357 |
| 5,299,132 A | 3/1994 | Wortham | 364/460 |
| 5,311,197 A | 5/1994 | Sorden et al. | 342/457 |
| 5,398,190 A | 3/1995 | Wortham | 364/460 |
| 5,454,027 A | 9/1995 | Kennedy, III et al. | 379/60 |
| 5,513,111 A | 4/1996 | Wortham | 364/460 |
| 5,519,321 A | 5/1996 | Hagen et al. | 324/318 |
| 5,539,810 A | 7/1996 | Kennedy, III et al. | 379/59 |
| 5,544,225 A | 8/1996 | Kennedy, III et al. | 379/59 |
| 5,555,286 A | 9/1996 | Tendler | 379/59 |
| 5,579,376 A | 11/1996 | Kennedy, III et al. | 379/60 |
| 5,610,969 A | 3/1997 | McHenry et al. | 379/56 |
| 5,610,972 A | 3/1997 | Emery et al. | 379/58 |
| 5,615,253 A | * 3/1997 | Koean et al. | 379/196 |
| RE35,498 E | 4/1997 | Barnard | 342/357 |
| 5,652,707 A | 7/1997 | Wortham | 364/460 |
| 5,694,322 A | 12/1997 | Westerlage et al. | 364/464 |
| 5,699,275 A | 12/1997 | Beasley et al. | 364/514 |
| 5,729,599 A | * 3/1998 | Plomondon et al. | 379/211 |

(Continued)

FOREIGN PATENT DOCUMENTS

| | | |
|---|---|---|
| NZ | 243068 | 4/1995 |
| NZ | 243768 | 4/1995 |

*Primary Examiner*—Chi Pham
*Assistant Examiner*—Alexander O. Boakye
(74) *Attorney, Agent, or Firm*—Leonard C. Suchyta, Esq.; Joel Wall, Esq.; Finnegan, Henderson, Farabow et al

(57) ABSTRACT

In a telecommunications network, a platform is provided to perform authorization, routing, gathering, and delivery of transmissions between multiple remote units and host locations. In a controlled environment, remote units are authorized to initiate transmissions to and receive transmissions from a limited number of locations. The platform stores profile information for remote units in a database, including services authorized for remote units based on timing events. The platform determines the appropriate destination for a transmission from a remote unit based on the profile information stored in the database and identifiers associated with the remote unit and telecommunications router serving the remote unit. The platform authorizes a transmission to the destination based on the profile information, determines a routing number associated with the destination, and transmits the routing number to an appropriate point in the network to enable completion of the transmission. The platform also determines whether a transmission from a remote unit triggers an event or includes content that may be stored and forwarded to a host destination. Additionally, the platform authorizes and routes transmissions from a host to a remote unit.

74 Claims, 17 Drawing Sheets

U.S. PATENT DOCUMENTS

| | | | |
|---|---|---|---|
| 5,742,906 A | 4/1998 | Foladare et al. | 455/461 |
| 5,758,281 A | 5/1998 | Emery et al. | 455/428 |
| 5,923,745 A * | 7/1999 | Hurd | 379/220 |
| 5,978,677 A | 11/1999 | Sawyer | 455/432 |
| 5,978,678 A | 11/1999 | Houde et al. | 455/433 |
| 6,021,126 A * | 2/2000 | White | 370/352 |
| 6,069,890 A * | 5/2000 | White et al. | 370/352 |

* cited by examiner

METHOD AND SYSTEM FOR AUTHORIZATION, ROUTING, AND DELIVERY OF TRANSMISSIONS

BACKGROUND OF THE INVENTION

The present invention relates to authorization, routing, gathering, and delivery of information in a telecommunications network, and more particularly, to a method and system for authorizing and routing transmissions and delivering information between numerous remote sites and a limited number of host sites.

The increased availability of cellular, or wireless, communications systems has resulted in a growing number of applications designed to use wireless communications technology. In particular, information services applications that require widespread service have been designed to rely on the presence of ubiquitous communications systems, whether wireless or wireline. The proliferation of wireless technology has allowed increased communications capability both for applications that are inherently mobile and for applications with numerous remote locations. Such applications include telemetry applications such as alarm and tracking systems in the equipment leasing industry and container tracking systems in the shipping and railroad industries. In these applications, typically hundreds or thousands of remote mobile units must communicate with one or more host locations.

For many applications, it is desirable to have a controlled environment that prevents unauthorized transmissions to and from remote units and ensures that information is routed to the proper destinations. For example, in a telemetry application, a mobile unit may be permitted to communicate only with a designated host location and not to freely initiate transmissions or receive transmissions from other locations. Also, based on the location of the mobile unit or a change in external business conditions, it may be desirable to ensure that a transmission from the mobile is routed to an authorized destination.

In today's environment of multiple service providers, especially in the wireless arena, there is no common denominator in how carriers interface with each other. Without adherence to a consistent set of standard features by network service providers, there is no single method of handling the authorization and routing necessary in a controlled environment or the gathering and delivery of information. The problem becomes greater as mobile units move between wireless service areas, whose networks may operate differently. Routing, authorization, and delivery of information in a controlled environment is even more difficult in an international setting, in which different standards abound.

It is desirable, therefore, to provide a means for authorizing and routing transmissions in a controlled environment. In particular, it is desirable to provide a means for authorizing and routing transmissions between numerous remote units and a limited number of host sites, utilizing both wireless and wireline networks. It is desirable to provide a means for authorizing and routing transmissions in such a way to reduce the possibilities of unauthorized transmissions, both to and from the remote units, particularly in the wireless communications environment. It is also desirable to provide a means for gathering and delivering information in a controlled environment. It is even more desirable to provide a ubiquitous means for authorizing, routing, gathering, and delivering information that enables a nationwide or international communications solution for applications or services in a controlled environment.

SUMMARY OF THE INVENTION

This invention satisfies those desires by providing a methodology for authorizing, routing, and delivering transmissions in a controlled environment.

A method consistent with the present invention for authorizing and routing a transmission comprises the steps of transmitting a source identifier and a router identifier to a platform across a signaling network, determining at the platform a routing number corresponding to a destination based on the source identifier, router identifier, and a profile stored at the platform, transmitting the routing number to the router across the signaling network, and routing the transmission via a telecommunications network using the routing number. Another method consistent with the present invention comprises the steps of routing a transmission from a source to a telecommunications network, querying a platform for routing instructions, determining at the platform a routing number based on the source identifier, router identifier, and a profile stored at the platform, transmitting the routing number to the router across the signaling network, and routing the transmission via a telecommunications network using the routing number.

A method consistent with the present invention for gathering and delivering a transmission comprises the steps of routing a set of digits dialed by a source to a platform, determining at the platform whether the digits represent a destination, an event trigger, or content to be stored and forwarded, and taking action based on that determination.

A method consistent with the present invention for routing and authorizing a transmission from a source comprises the steps of transmitting from the source to a platform via a data network a request for a routing number corresponding to a destination, determining at the platform whether the source is authorized to transmit to the destination, obtaining a routing number from a router serving the destination, storing the routing number at the platform, and signaling the source to initiate the transmission. Another method consistent with the present invention further comprises the step of transmitting the routing number to the source.

Apparatus and networks are also provided for carrying out the methodologies of the present invention.

The advantages accruing to the present invention are numerous. By providing a platform that stores profile information corresponding to remote units and host destinations, the present invention provides a method for authorizing and routing transmissions in both directions between remote units and host locations. By defining several interfaces to the platform, the present invention allows for ubiquitous authorization and routing capabilities in a controlled environment, solving the problem of inconsistent availability of features among wireless networks. The present invention also provides a method for determining whether transmissions should be gathered and delivered to a host in controlled environment.

The above desires, and other desires, features, and advantages of the present invention will be readily appreciated by one of ordinary skill in the art from the following detailed description of the preferred implementations when taken in connection with the accompanying drawings.

DETAILED DESCRIPTION OF THE PREFERRED EMBODIMENTS

Figure 1:
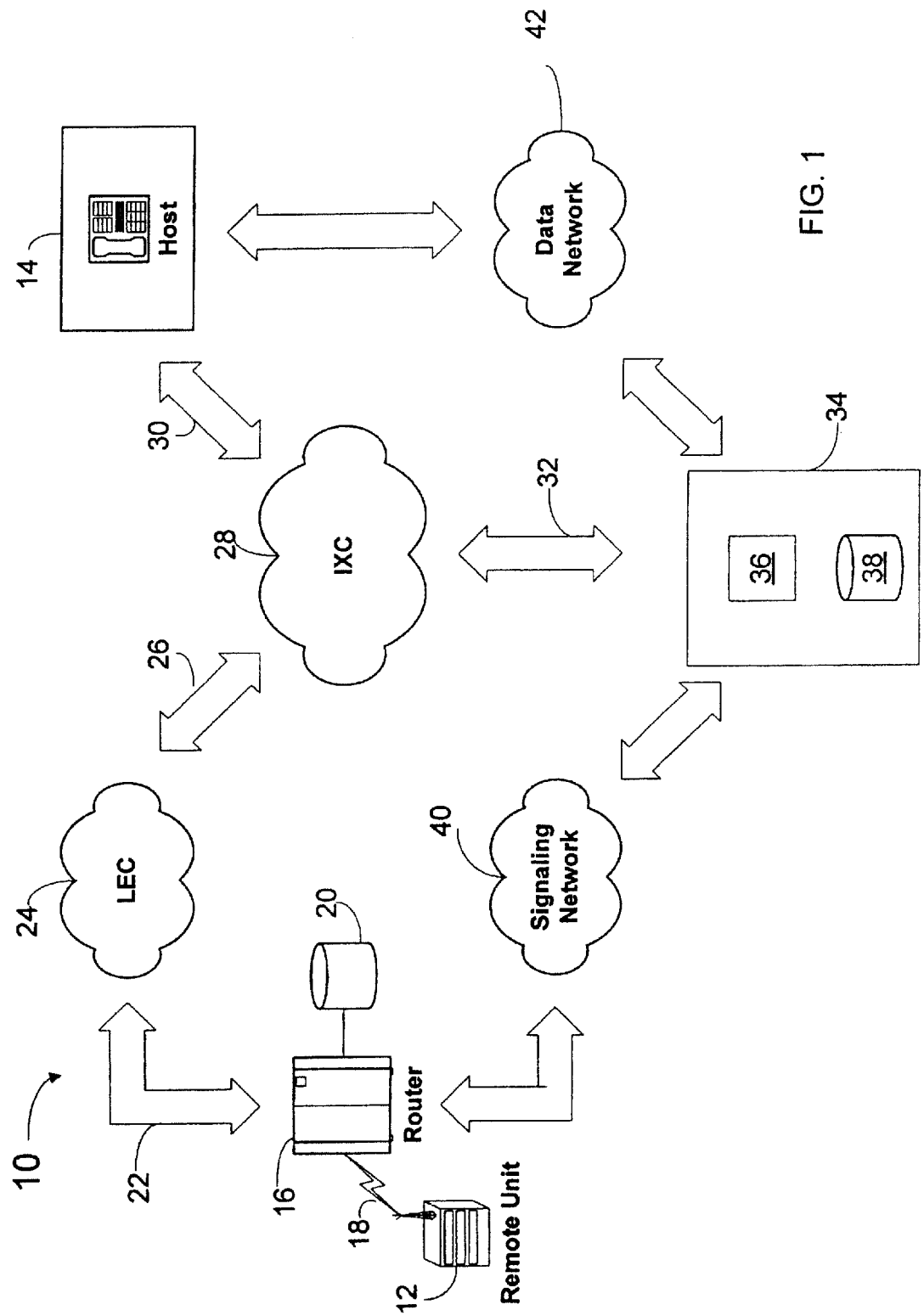
FIG. 1 is a high level block diagram of a network in which the authorization and routing scheme consistent with the present invention may be implemented.

FIG. 1 shows a high level block diagram of a network, designated generally by reference numeral 10, within which the present invention may operate. Network 10 enables bi-directional communication between remote unit 12 and host 14. Remote unit 12 may be attached to a leased piece of construction equipment in an equipment alarm and tracking system, for example, or may be attached to a container in a shipping tracking system. Host 14 may be, for example, a centralized computer that tracks location and status information as part of a container tracking application or a system that responds to alarms as part of an equipment alarm application. Remote unit 12 is served by router 16, with which it communicates over communications link 18. As illustrated in FIG. 1, remote unit 12 may be a mobile or wireless device, its router 16 may be a Mobile Switching Center (MSC), and link 18 may be a wireless link. An MSC processes transmissions in a wireless system to determine the connection path to other wireless devices and to wireline devices. While FIG. 1 illustrates remote unit 12 and router 16 as part of a wireless system, it should be understood that the invention is equally applicable to wireline and wireless remote units and that router 16 may be any type of router or switch, wireless or wireline.

Router 16 maintains database 20 for storing profile information associated with remote unit 12. Database 20 may be part of router 16 or a separate entity. Consistent with the present invention, database 20 may be a Visiting Location Register (VLR) when remote unit 12 is a mobile unit and router 16 is an MSC. As will be described below, all mobile units in a wireless system consistent with the present invention will be considered to always be roaming, or "visiting."

When remote unit 12 initiates a transmission, which may be a voice, data, or video transmission, router 16 receives the transmission over communications link 18. As will be described below, a number of signaling and/or data messages may be transmitted within the network to enable completion of the transmission. The transmission may also be delivered from router 16 to host 14 via one or more telecommunications networks. For example, as illustrated in FIG. 1, router 16 transmits information along communications link 22 to Local Exchange Carrier (LEC) network 24, which transmits the information along communications link 26 to Interexchange Carrier (IXC) network 28, which transmits the information along communications link 30 to host 14. Similarly, when host 14 initiates a transmission to remote unit 12, the transmission traverses communications link 30 to IXC network 28, which transmits the information over communications link 26 to LEC network 24, which transmits the information over communications link 22 to router 16. To complete the transmission, router 16 transmits the information over communications link 18 to remote unit 12.

To enable authorization and routing of transmissions made to or from remote unit 12, and to perform gathering and delivery of information, a network consistent with the present invention includes platform 34. As illustrated in FIG. 1, platform 34 includes at least two functions, processing function 36 and database function 38. Functions 36 and 38 may or may not be co-located within one piece of equipment. Processor 36 may be, for example, a service control point (SCP), which interacts with stored data to provide signaling information relating to transmissions in a telecommunications network. Database 38 may be, for example, a Home Location Register (HLR), a database that stores subscriber information for wireless networks.

Platform 34 connects to other elements of the network through several interfaces. IXC network 28 interfaces to platform 34 via signaling interface 32. As will be detailed below, IXC network 28 may request routing instructions for a transmission from platform 34 over signaling interface 32. Signaling interface 32 may use, for example, Signaling System 7 (SS7) protocol or any other signaling protocol, depending on the signaling network used by IXC network 28.

In an embodiment consistent with the present invention, platform 34 communicates with router 16 via signaling network 40. Transmission of signaling messages across signaling network 40 facilitates routing and authorization of transmissions to and from remote unit 12 and also enables platform 34 to gather and store data from remote unit 12 and router 16. In the case where router 16 is a wireless router or switch, messages transmitted across signaling network 40 may use IS-41 protocol. IS-41 is a TIA standard protocol used for transmission management between HLRs and VLRs. Thus, consistent with the present invention, all wireless remote units will be considered to be visiting to enable communication between database 20, which may be a VLR in a wireless environment, and platform 34, which includes database 38, which has the functionality of an HLR in a wireless environment. Currently, there are several versions of IS-41 operating on wireless equipment, including Revisions A, B, and C. ANSI 41 is a standardized version of IS-41 Revision C. Even two switches operating the same version of IS-41 do not necessarily have identical feature sets. Signaling network 40 may also use Global System for Mobile Communication (GSM) in place of IS-41. Signaling network 40 may also be any type of data network that allows transmission of messages, e.g., an X.25 network.

Also consistent with the present invention, platform 34 communicates with host 14 via data network 42. As will be described below, data network 42 facilitates routing and authorization of transmissions from host 14 to remote unit 12. Data network 42 transmits messages between host 14 and platform 34, and therefore may be any type of data network that allows transmission of messages. In particular, data network 42 may use Internet Protocol (IP) to transmit messages. Data network 42 may also be an X.25 network or any other data or signaling network.

Figure 2:
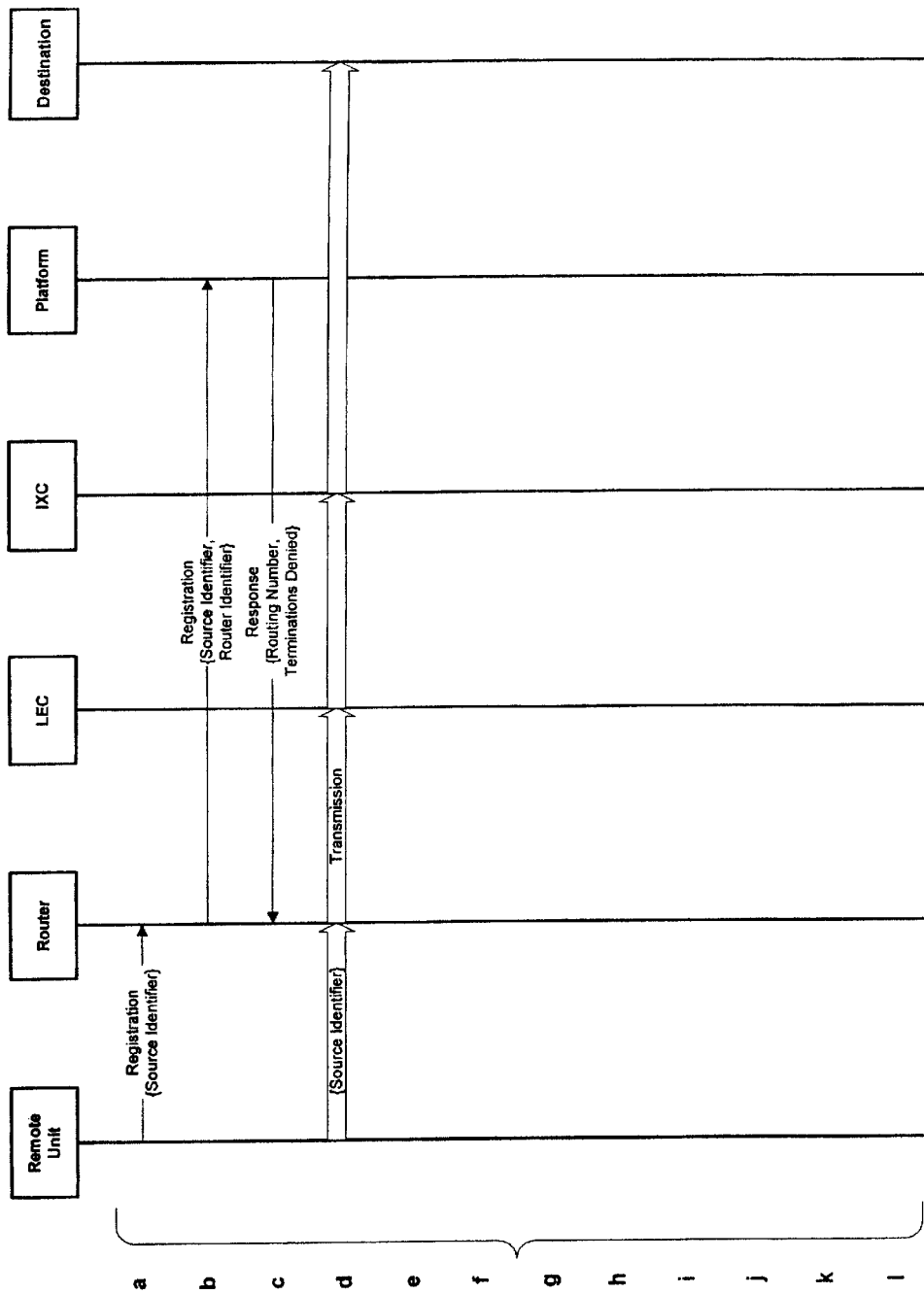
FIG. 2 is a flow diagram illustrating a method for routing and authorizing transmissions consitent with the present invention.

Consistent with the present invention, there are several methods of routing and authorizing transmissions from remote unit 12, all of which include processing at platform 34. FIG. 2 illustrates a method for routing a transmission consistent with the present invention. In FIG. 2, at some point in time before remote unit 12 initiates a transmission, remote unit 12 registers with router 16. Router 16 then transmits registration information to platform 34 over signaling network 40. Registration information includes remote unit identification and optionally router identification. When router 16 is a wireless device, registration of remote unit 12 may occur using autonomous registration. In this case, database 38 at platform 34 includes the functionality of an HLR. Thus, whenever a remote mobile unit is activated or enters a new service area, registration of the remote unit occurs. Remote unit identification may include a number or series of numbers associated with the remote unit, such as the Mobile Identification Number (MIN), and the Electronic Serial Number (ESN) of the remote unit. Router identification may include the location of the area or network served by the router in addition to an identifier specifying the actual router.

As illustrated in FIG. 2, platform 34 determines a profile associated with remote unit 12 upon receiving registration information over signaling network 40 from router 16. Profile information is stored in database 36, the profile including a list of services authorized for the remote unit based on several parameters. Services are authorized based on the identifier and location of the remote unit, the identifier and location of the router, and the identifier and location of the host computer, as well as the occurrence of timing events. Based on registration information received, profile information stored in database 38, and possible external events, processor 36 determines the host at which transmissions from remote unit 12 are supposed to terminate. Consistent with the present invention, platform 34 determines the appropriate host destination using the remote unit identification and at least one of the following pieces of information: the router identification, received by platform 34 during registration, the services authorized for the remote unit, and timing events.

Consistent with the present invention, remote unit identification and router identification are used in combination to determine the appropriate host destination. For example, it may be desirable to route transmissions from a particular remote unit, served by one set of routers or service areas, to one destination, and transmissions from the same remote unit, when served by a second set of routers or service areas, to a second destination. Thus, if the application using the network consistent with the present invention is an alarm system, the destination host is selected based not only on the remote unit trying to transmit, but also on the location of the remote unit, as determined by identifying the router serving the remote unit. In this way, the appropriate host for responding to the alarm sent by the remote unit can be selected.

Also consistent with the present invention, platform 34 may use the remote unit identification to determine the services authorized for that remote unit by searching database 38. Different remote units may subscribe to different services, and different hosts may be used in connection with different services, so as a result the appropriate destination host for transmissions from the remote unit may vary based on services authorized, as stored in database 38. Additionally, even if a remote unit subscribes to a service, the service may not be active, so platform 34 does not authorize a service if it is not active. Furthermore, even an authorized service may not be available, based on, for example, the capabilities of the router serving the remote unit. Thus platform 38 considers all of these factors when determining which services are authorized for a particular remote unit and which host should receive transmissions from the remote unit based on the authorized services.

Consistent with the present invention, platform 34 may also consider timing events in connection with the remote unit identification to determine the appropriate host destination. The destination may vary for a particular remote unit based on time of day or day of week. Platform 34 also adjusts its selection of host based on the time zone of the timing event, which may occur at the remote unit, the router, or the host.

As illustrated in FIG. 2, once platform 34 determines the appropriate destination for routing of transmissions from remote unit 12, platform 34 transmits a routing number corresponding to that destination via signaling network 40 to router 16. If autonomous registration is used, the destination routing number is part of a restricted profile stored at router 16 in database 20 for remote unit 12. This is referred to as a "hotline" number, so that regardless of what number the remote unit dials, the transmission will be routed to the destination. In a controlled environment consistent with the present invention, platform 34 may also transmit via signaling network 40 an instruction for router 16 to deny any transmission terminations to remote unit 12. Therefore, remote unit 12 can only initiate transmissions and cannot receive any transmissions from any source.

As illustrated in FIG. 2, when remote unit 12 initiates a transmission, router 16 receives the transmission and routes it to a telecommunications network along with the destination routing number stored in router 16. Therefore, remote unit 12 can communicate only with the host determined by platform 34. FIG. 2 shows the transmission routed from router 16 through LEC 24 to IXC 28. However, if the host is served by the same LEC as the router, the transmission does not need to be routed through IXC 28. Alternatively, if router 16 has a direct connection to IXC 28, the transmission does not need to be routed through LEC 24.

Figure 3:
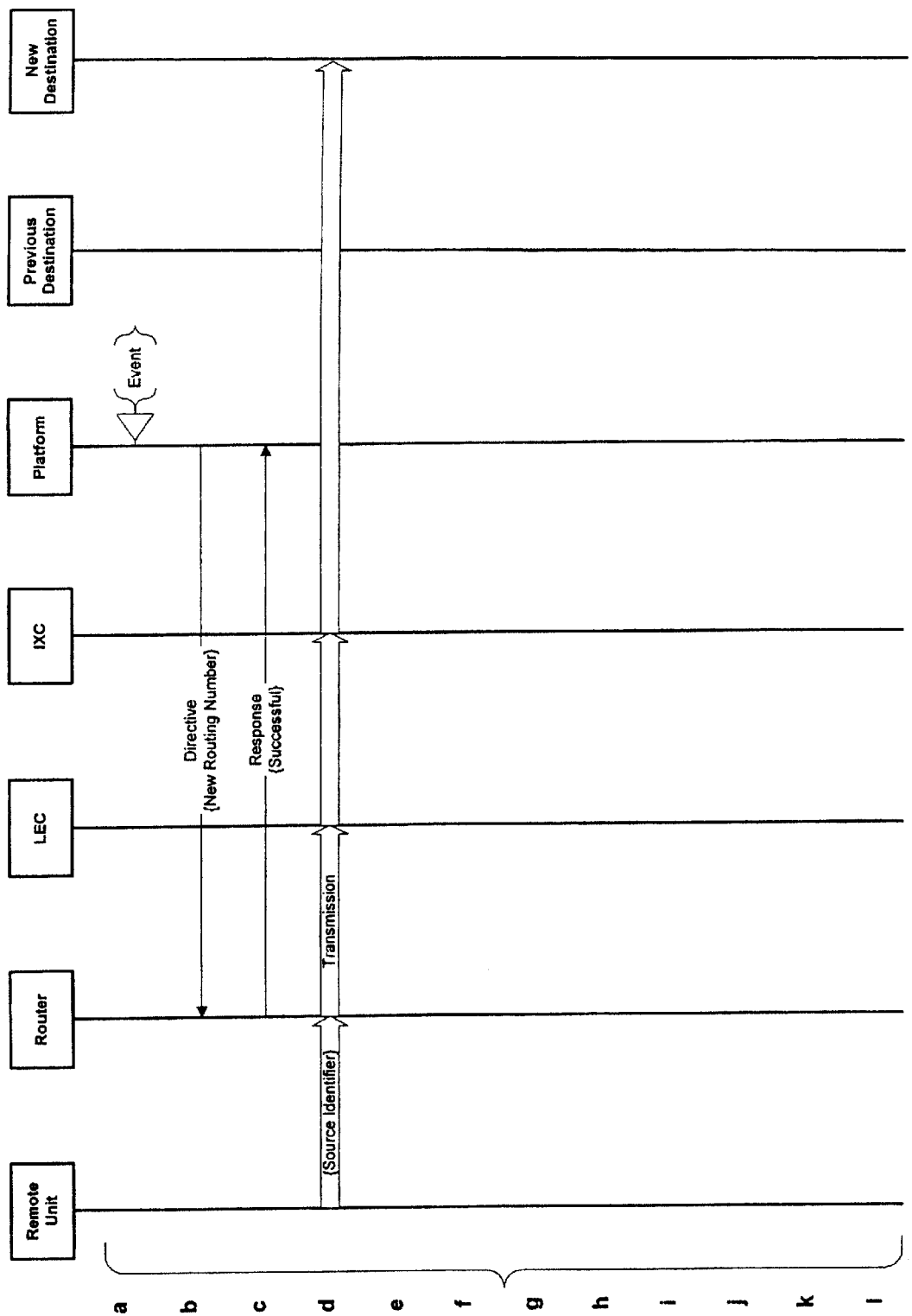
FIG. 3 is a flow diagram illustrating additional steps of a method for routing and authorizing transmissions consistent with the present invention.

Finally, because events may occur to change the appropriate host destination for a particular remote unit without the remote unit moving to a different router, FIG. 3 illustrates platform 34 transmitting a new destination routing number to router 16 for remote unit 12 in response to the occurrence of an event. For example, database 38, which stores services authorized for the remote unit, may be modified, causing a change in the appropriate host destination. Also, there may be a change in availability of services for the remote unit. Additionally, a timing event, such as the recurrence of a particular time of day, may cause the appropriate destination to change. In all of these cases, platform 34 transmits a new destination routing number to router 16, so that the next transmission from remote unit 12 will be routed to the newly determined destination.

Figure 4:
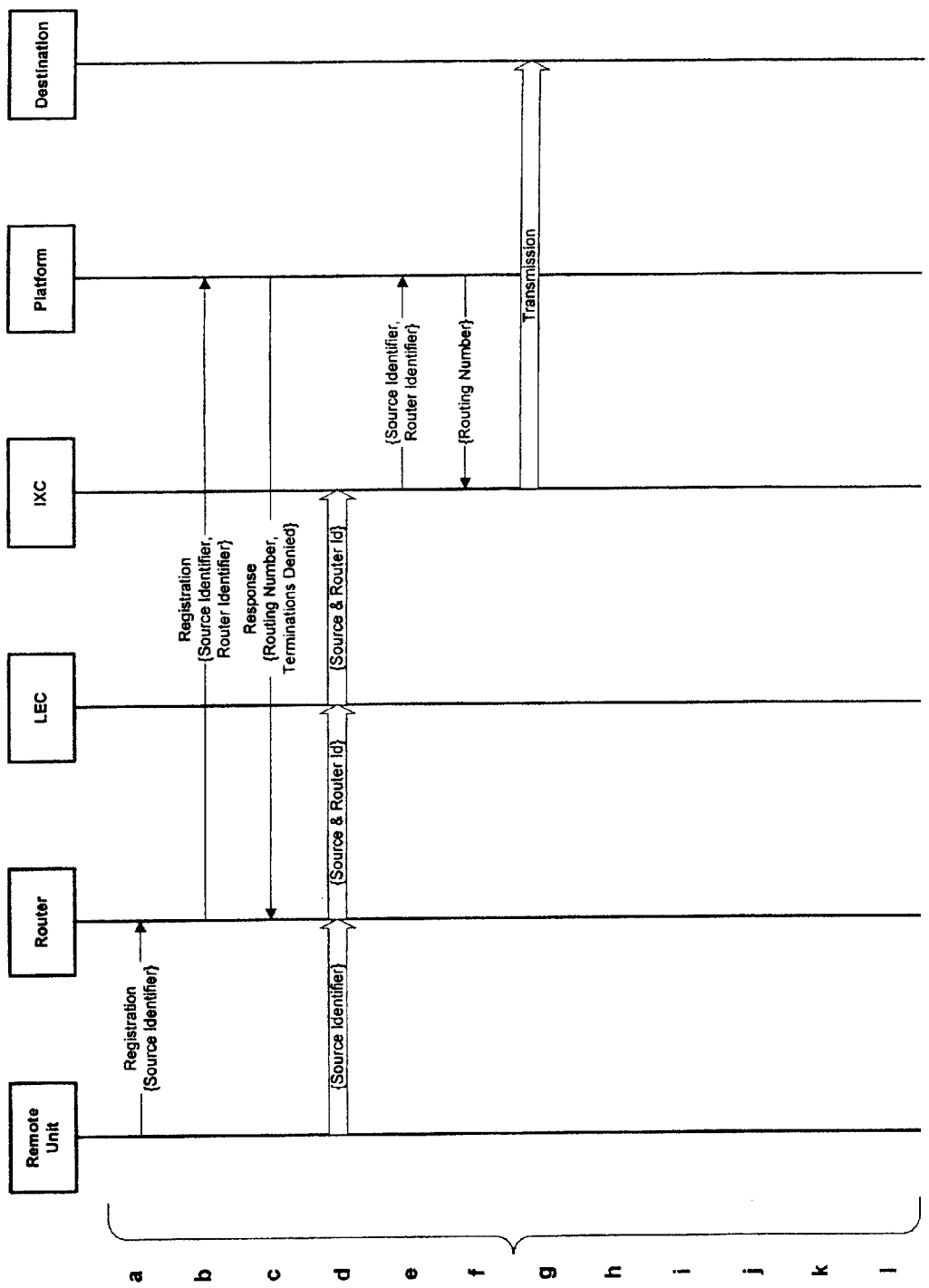
FIG. 4 is a flow diagram illustrating another method for routing and authorizing transmissions consistent with the present invention.

FIG. 4 illustrates another method for routing transmissions from remote unit 12 consistent with the present invention. This method is useful when there are multiple host destinations. Rather than transmit to the router a routing number corresponding to the host, platform 34 transmits a routing number corresponding to platform 34 itself. All transmissions from remote unit 12 then are routed to platform 34, which makes a real-time determination of the appropriate destination for the transmission, as will now be described.

Similar to FIG. 2, FIG. 4 illustrates remote unit 12 registering by sending its identifier to router 16, which transmits it to platform 34. Based on its recognition of the remote unit identifier, platform 34 transmits to router 16 a routing number corresponding to platform 34. Optionally, platform 34 instructs router 16 to restrict terminations at remote unit 12. As in connection with FIG. 2, registration of remote unit 12 in FIG. 4 may take place using autonomous registration.

With continuing reference to FIG. 4, when remote unit 12 initiates a transmission, router 16 routes the transmission to a telecommunications network. The telecommunications network, for example an IXC as shown in FIG. 4, sends a routing request to platform 34 over signaling interface 32. For example, if the routing number corresponding to platform 34 is an 800 number, IXC 28 requests routing instructions through a signaling interface such as SS7. As the transmission is routed, the remote unit identification is passed with the transmission. For example, the number of the remote unit is passed as ANI along with the transmission. When issuing the routing request, IXC 28 transmits the remote unit identifier to platform 34. Platform 34 then determines the appropriate host destination for the transmission from remote unit 12 based on the remote unit identifier. Platform 34 returns the routing number associated with the appropriate host to IXC 28, which routes the transmission to the destination.

In FIG. 4, the determination by platform 34 of the appropriate host destination may be complex, as described in connection with FIG. 2. The platform may also consider the services authorized for the remote unit and certain timing events, as described earlier. Additionally, platform 34 may consider an identification associated with a router. There are two possibilities for obtaining router identification. First, the router identifier may be passed along with the transmission, so that platform 34 receives the router identifier from IXC 28. Second, platform 34 may use the currently registered location to determine the appropriate destination. The currently registered location is the router identifier from the registration process, which is stored at platform 34 in database 38. When platform 34 receives a request for routing instructions from IXC 28, platform 34 accesses the stored router identifier to use in determining the host destination for the transmission.

Figure 5:
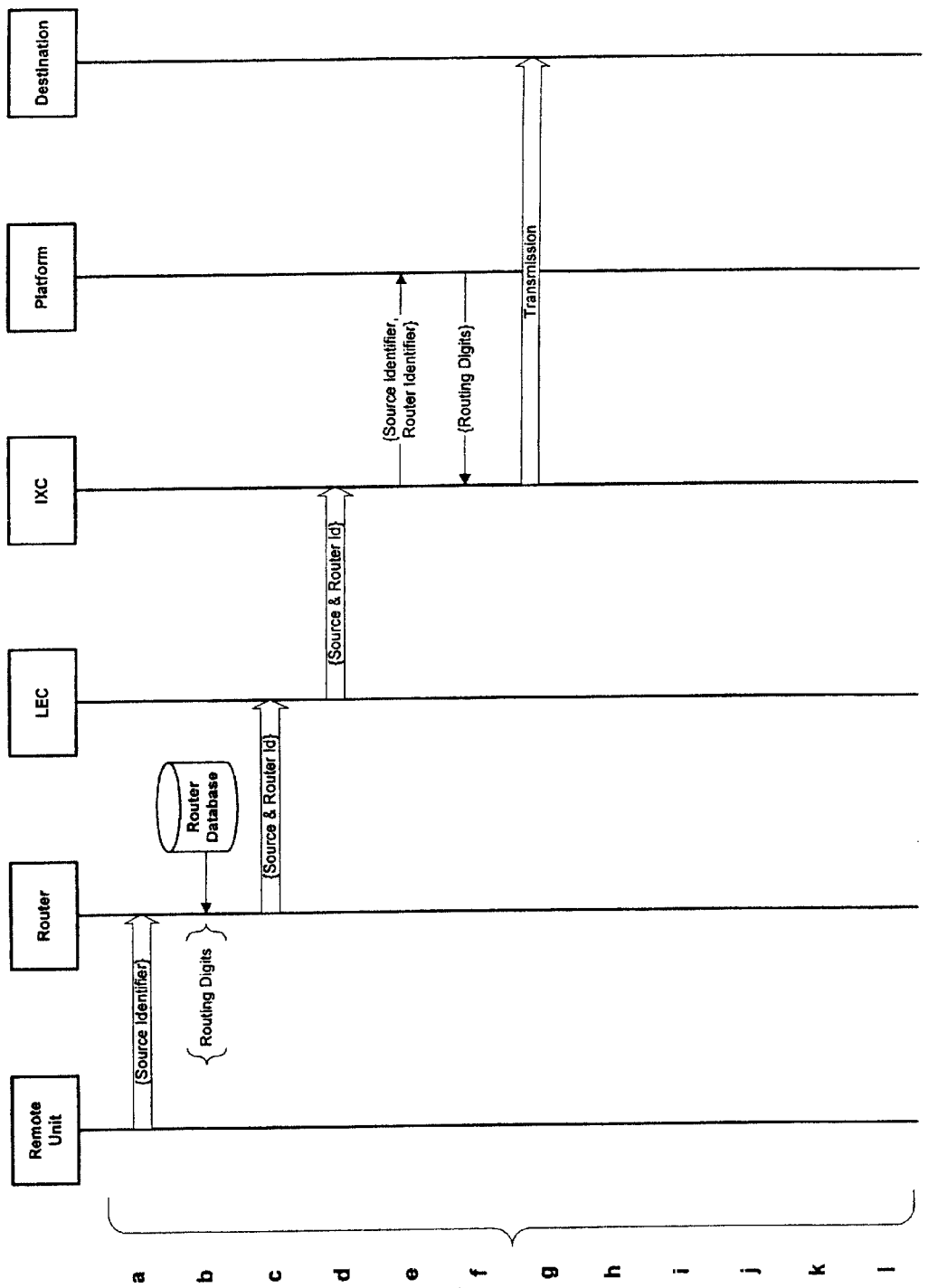
FIG. 5 is a flow diagram illustrating yet another method for routing and authorizing transmissions consistent with the present invention.

FIG. 5 illustrates yet another method for routing a transmission from remote unit 12 consistent with the present invention. As illustrated in FIG. 5, router 16 stores the routing number corresponding to platform 34 in its database. If remote unit 12 does not register, as illustrated in FIGS. 2 and 4, or if router.16 does not receive a routing number from platform 34, router 16 must retrieve a routing number from its own database. When remote unit 12 initiates a transmission, it sends the remote unit identifier to router 16. Router 16 then searches in router database 20 to obtain a routing number based on the remote unit identifier. Consistent with the present invention, the routing number obtained by router 16 corresponds to platform 34, enabling platform 34 to intercept the transmission and determine the ultimate routing destination.

Router 16 routes the transmission via one or more telecommunications networks, shown as the LEC and IXC by way of example in FIG. 5. The remote unit identifier and possibly the router identifier are transmitted along with the transmission. For example, the remote unit identifier may be transmitted as an Automatic Number Identifier (ANI). Upon recognizing the routing number corresponding to platform 34, the IXC requests routing instructions from platform 34. When issuing this request, the IXC forwards the remote unit identifier and possibly the router identifier to platform 34. Platform 34 then determines from information in database 38 the appropriate host destination for the transmission from remote unit 12 based on at least the remote unit identifier. As described earlier in connection with FIG. 4, platform 34 may also base its determination of the appropriate host destination on the router identifier passed from the IXC, the authorized services stored in the router database, and/or external timing events. Platform 34 returns the routing number associated with the appropriate host to IXC 28, which routes the transmission to the destination.

In response to the remote unit identifier and the router identifier received from IXC 28, platform 34 may determine that remote unit 12 is initiating unauthorized transmissions. This determination is useful in the case where there is no signaling network between router 16 and platform 34, or where remote unit 12 does not complete registration. The only information platform 34 receives concerning remote unit 12 arrives from IXC 28. If platform 34 determines that remote unit 12 is initiating unauthorized transmissions, platform 34 may send an instruction to router 16 to restrict transmissions from remote unit 12. If there is no signaling network, the instruction may be sent via other means, such as electronic mail. Additionally, platform 34 may instruct IXC 28 to terminate the current transmission, or platform 34 may return instructions routing the transmission to a destination other than the host. This alternate destination may be an intercept number that handles the unauthorized transmission, possibly playing a recording indicating to remote unit 12 that the transmission is unauthorized.

Figure 6:
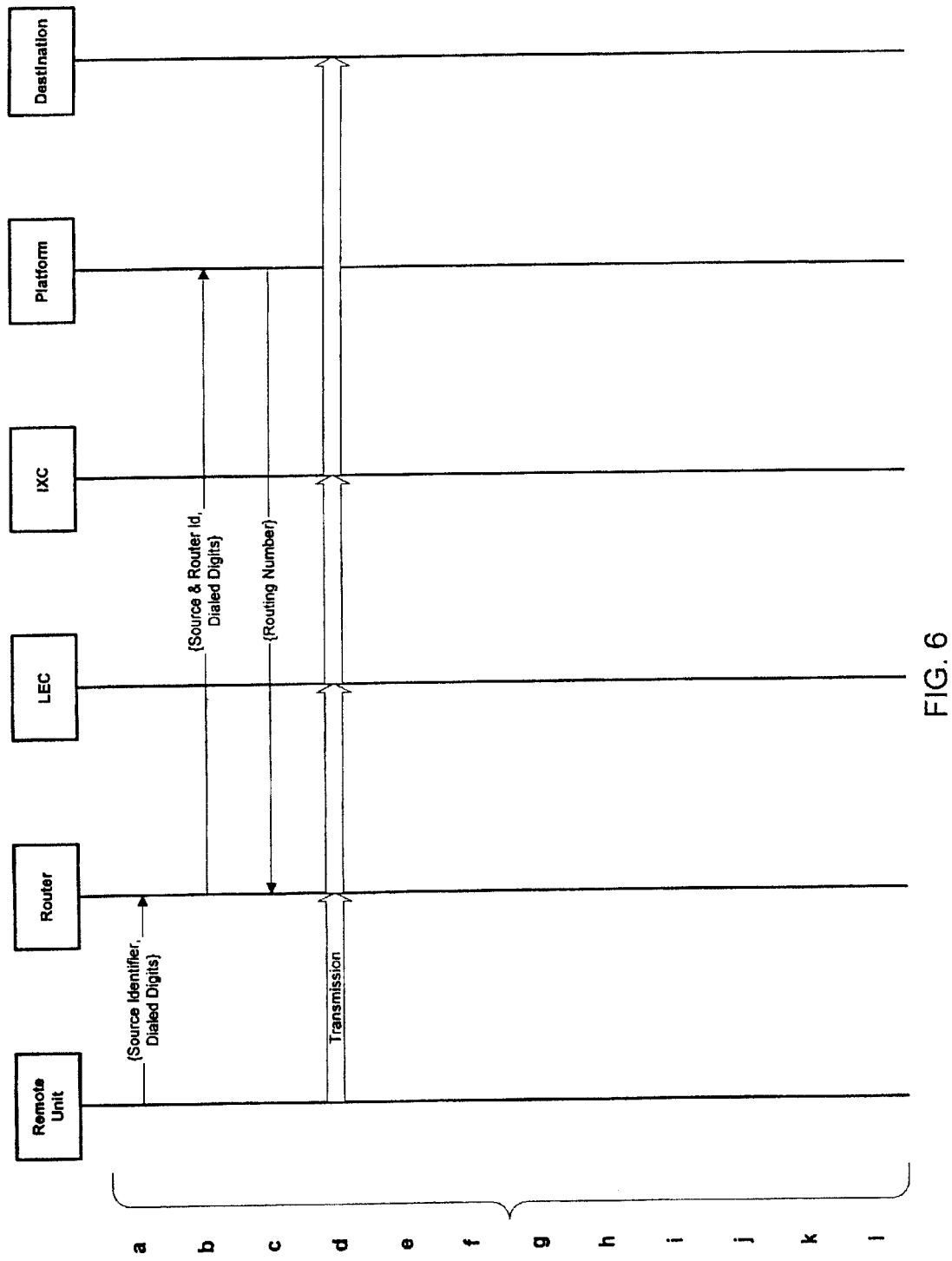
FIG. 6 is a flow diagram illustrating a method consistent with the present invention for routing and authorizing transmissions utilizing the digits dialed by a source.

Methods consistent with the present invention for routing, authorizing, and delivering transmissions from remote unit 12 to host 14 may also utilize digits dialed by remote unit 12. FIGS. 6–10 illustrate such methods. As illustrated in FIG. 6, remote unit 12 initiates a transmission by dialing a set of digits. The set of digits may be zero or more digits. If remote unit 12 is a wireless device, zero digits may be sent simply by pressing the SEND button. Router 16 receives the dialed digits and transmits them to platform 34 via signaling network 40. There are a number of methods for sending dialed digits from a wireless device via a signaling network. For example, in IS-41, dialed digits may be passed using an origination trigger or a feature request. The latter requires the dialed digits to be preceded by "*" or "" Regardless of the method used to send the dialed digits, platform 34** consistent with the present invention interprets the digits and takes appropriate action, as will now be described.

With continuing reference to FIG. 6, both the set of dialed digits and the remote unit identifier are transmitted to router 16. Router 16 then transmits the set of dialed digits, the source identifier, and possibly the router identifier to platform 34 via signaling network 40. Platform 34 determines whether the dialed digits correspond to a destination by searching database 38 for the source identifier and the services authorized for the source. For example, information in database 38 indicates whether a set of dialed digits corresponds to a destination. If platform 34 determines the dialed digits correspond to a destination, platform 34 may also determine whether remote unit 12 is authorized to transmit to the corresponding destination. This determination is also based on the source identifier and the list of services authorized for the source, both stored in database 38. The determination of whether the dialed digits correspond to a destination and the authorization of the transmission may also depend on the occurrence of a timing event, as described in connection with previous figures. If platform 34 determines that the dialed digits correspond to a destination and that remote unit 12 is authorized to transmit to that destination, platform 34 transmits a routing number corresponding to that destination back to router 16. Finally, remote unit 12 initiates a transmission to the destination via a telecommunications network using the returned routing number.

Figure 7:
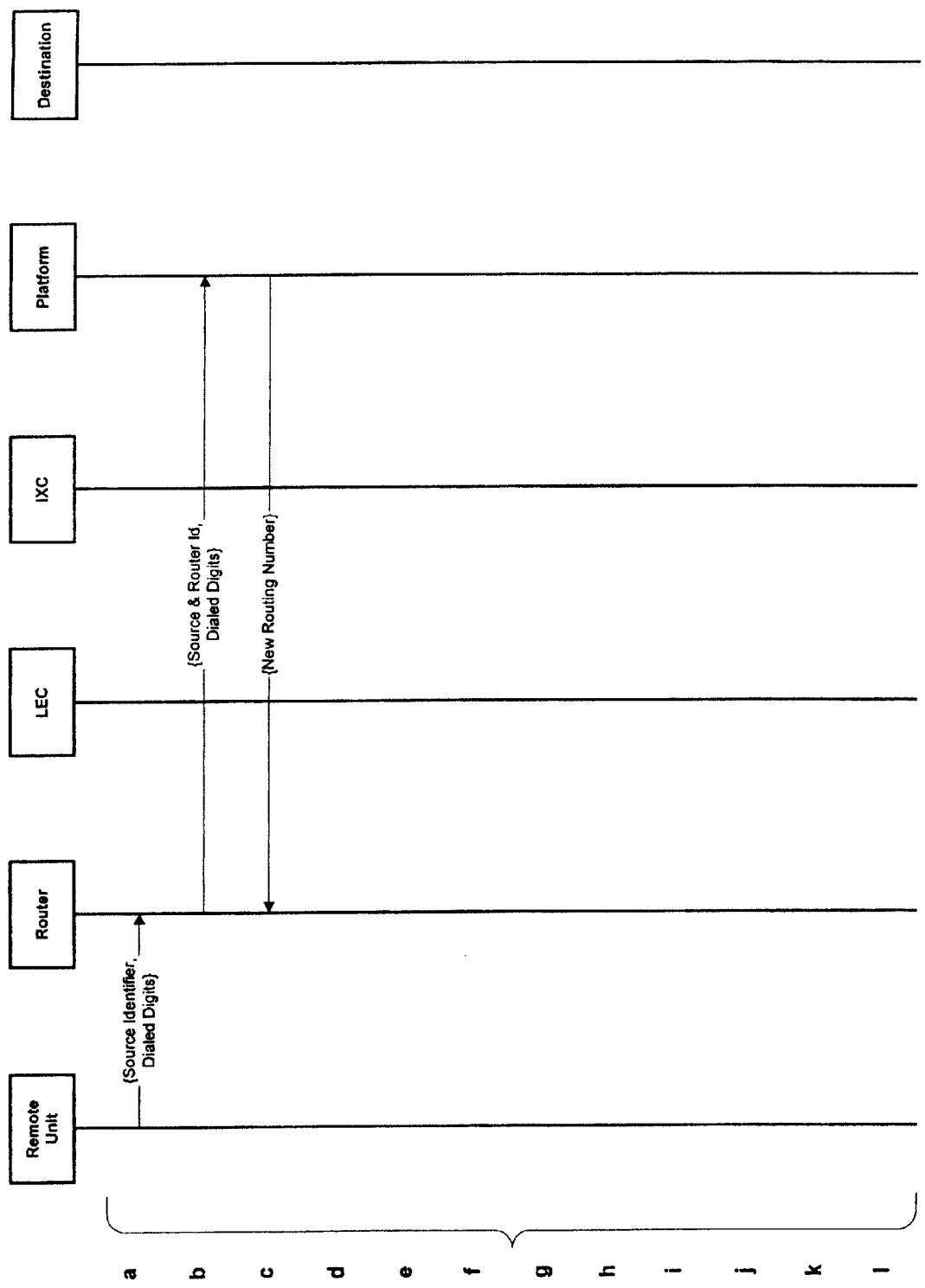
FIG. 7 is a flow diagram illustrating a method consistent with the present invention for routing and authorizing transmissions utilizing the digits dialed by a source to trigger an event.

Consistent with the present invention, platform 34 may also determine whether the dialed digits are intended to trigger an event. This determination also depends on the source identifier and the sources authorized for the source, which are stored in database 38. Optionally, platform 34 may also consider the router identifier, if it is passed to platform 34 via signaling network 40, and the occurrence of a timing event. FIG. 7 illustrates an example of an event triggered by the dialed digits. Platform 34 determines that the dialed digits indicate a new routing number that should be stored at router 16 in database 20 as part of the profile for remote unit 12. The dialed digits do not necessarily have to be identical to the new routing number. For example, "1" or "*1" may indicate that the new routing-number should be one 800 number, and "2" or "*2" may indicate that the new routing number should be a second 800 number. Platform 34 obtains the new routing number from database 38 and transmits it to router 16 via signaling network 40 to be stored in database 20. The next transmission from remote unit 12 will be routed using the new routing number. The new routing number may correspond, for example, to a different host destination from the one whose routing number was previously stored in the database, as illustrated in connection with FIG. 2.

Figure 8:
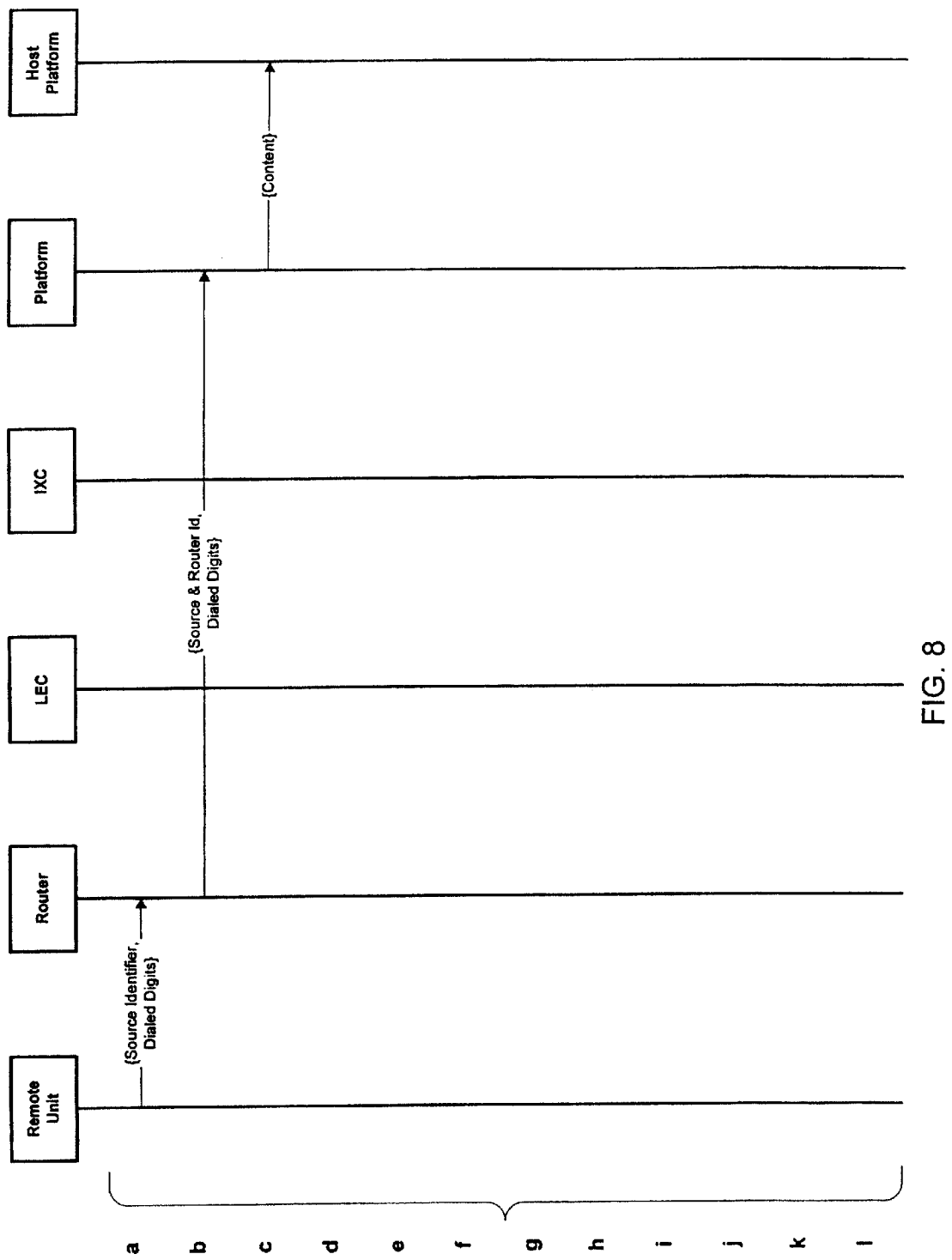
FIG. 8 is a flow diagram illustrating a method for gathering and delivering transmission content consistent with the present invention.
Figure 9:
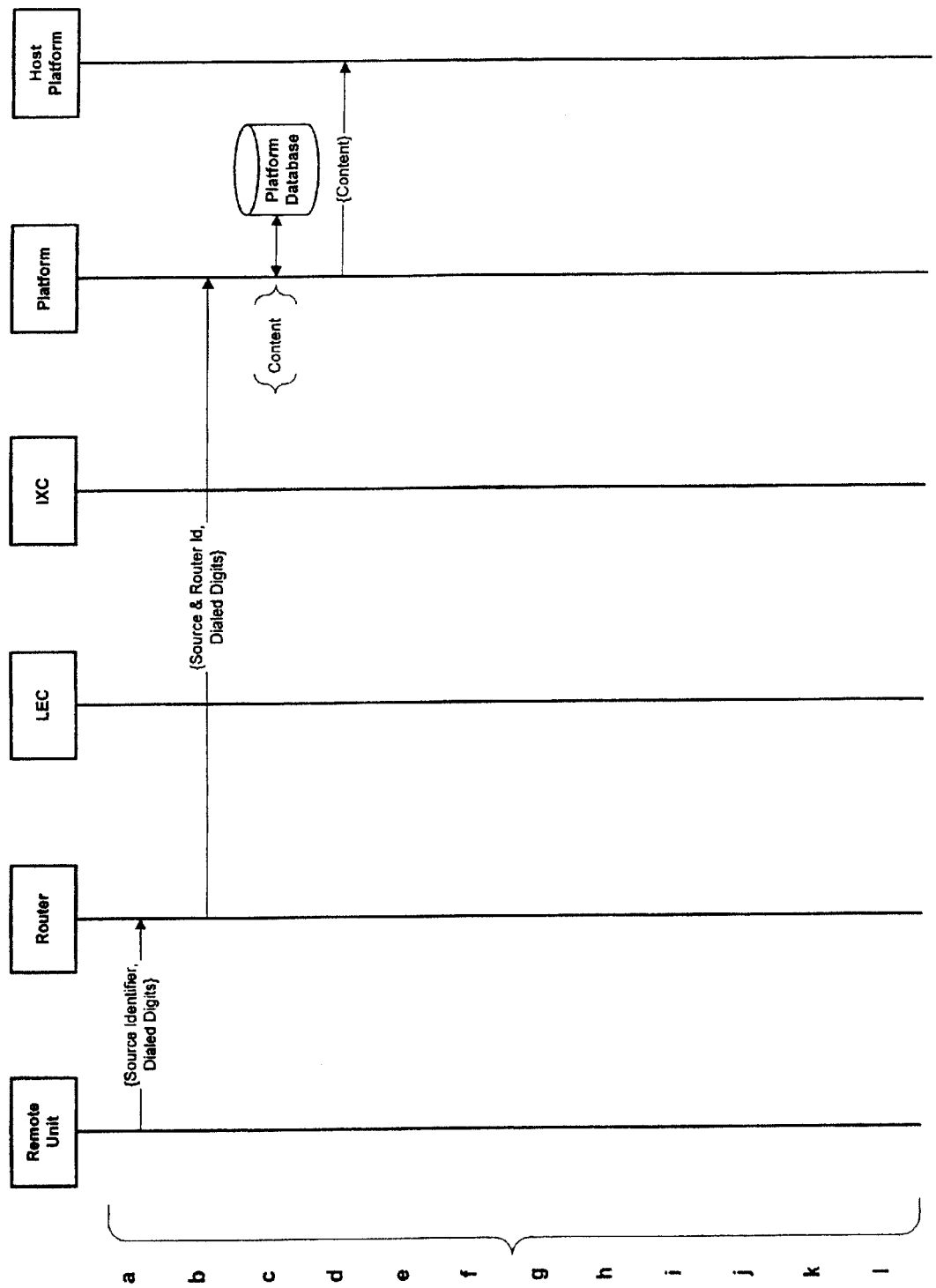
FIG. 9 is another flow diagram illustrating a method for gathering and delivering transmission content consistent with the present invention.
Figure 10:
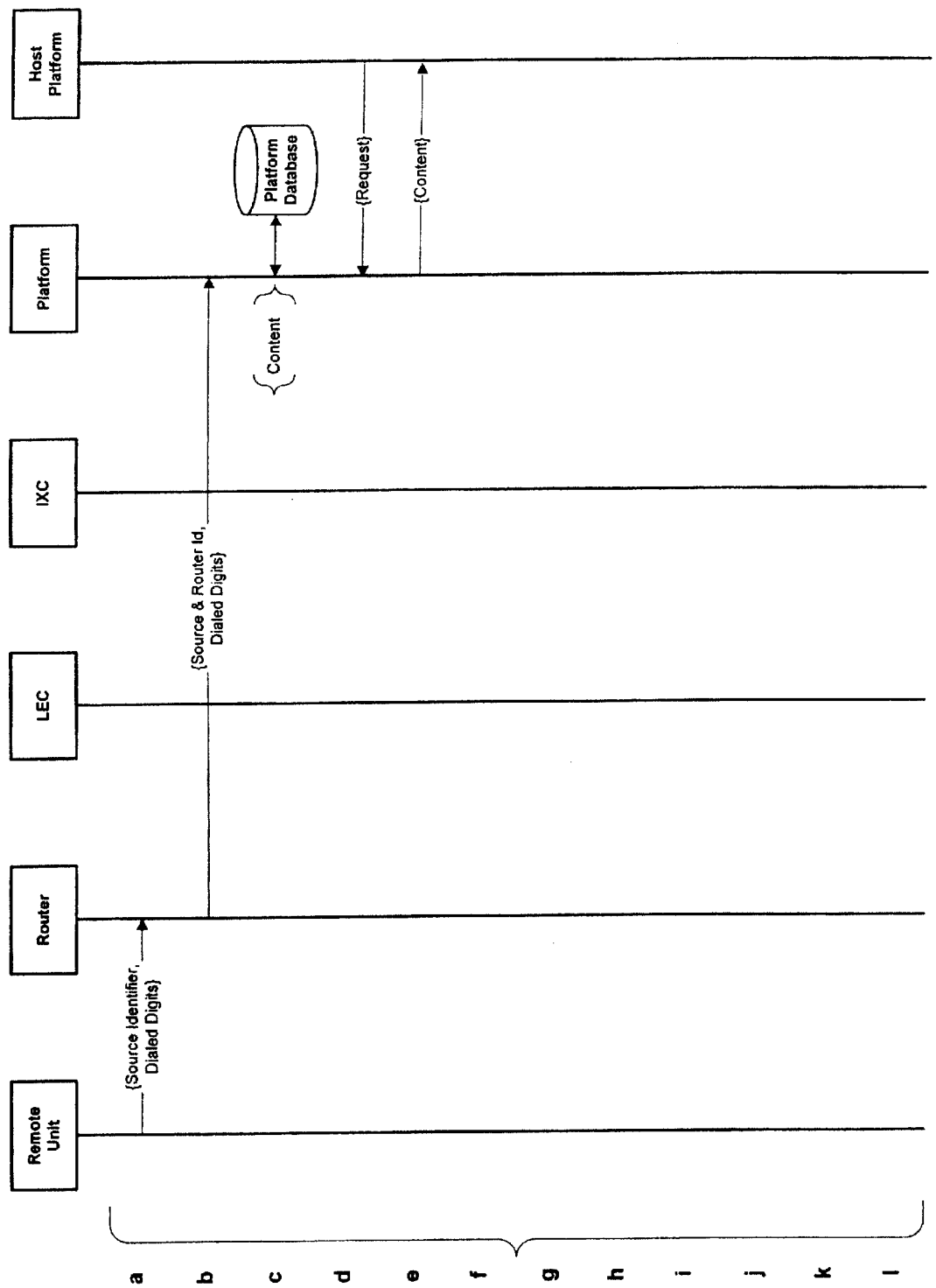
FIG. 10 is yet another flow diagram illustrating a method for gathering and delivering transmission content consistent with the present invention.

Also consistent with the present invention, platform 34 may determine whether the dialed digits represent content, as illustrated in FIGS. 8 and 9. This Idetermination also depends on the source identifier and the services authorized for the source, which are stored in database 38. Optionally, platform 34 may also consider the router identifier, if it is passed to platform 34 via signaling network 40, and the occurrence of a timing event. As illustrated in FIG. 8, once platform 34 determines that the dialed digits represent content, platform 34 also determines whether to notify host 14 that it has received the dialed digits. If platform 34 determines it should notify host 14, it transmits a message to host 14 indicating is has received the dialed digits. Alternatively, platform 34 may'simply transmit the dialed digits to host 14 once it determines the dialed digits represent content to be transmitted immediately to host 14.

FIG. 9 illustrates a method consistent with the present invention in which platform 34 stores and optionally forwards the dialed digits to the host once platform 34 determines that the dialed digits represent content. Similarly, in FIG. 10, platform 34 forwards the stored dialed digits to host 14, but only after host 14 sends a request or instruction to platform 34 to forward the dialed digits. Host 14 may, for example, periodically request stored content from platform 34.

Figure 11:
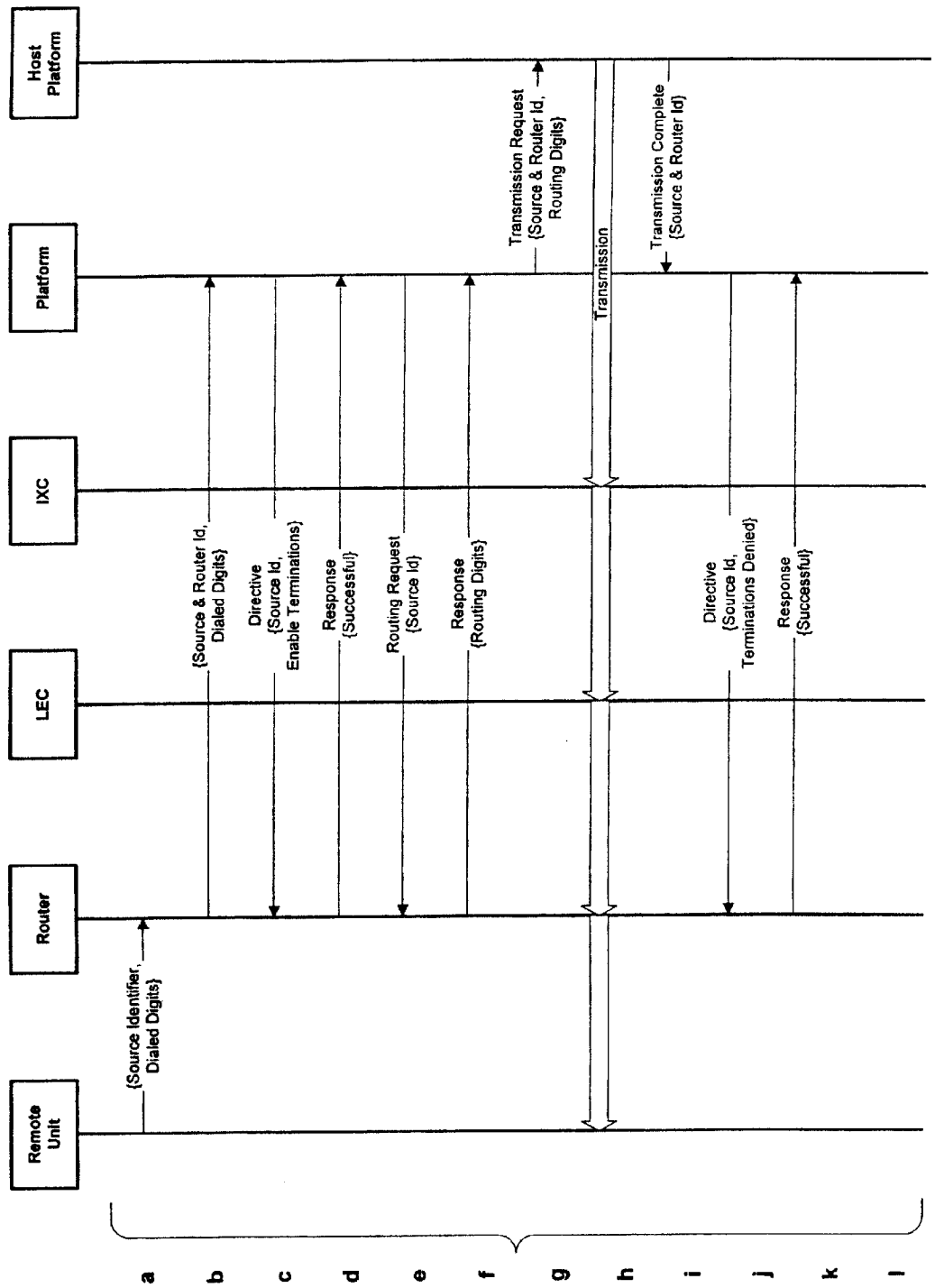
FIG. 11 is a flow diagram illustrating a method consistent with the present invention for requesting a destination to initiate a transmission back to a source.

FIG. 11 illustrates another example of a method consistent with the present invention in which the dialed digits trigger an event. In this scenario, remote unit 12 sends dialed digits to request that host 14 initiate a transmission back to unit 12. Remote unit 12 transmits dialed digits and a source identifier to router 16. Router 16 transmits the dialed digits, the source identifier, and the router identifier to platform 34 via signaling network 40. Platform 34 determines, based on the received information and information in database 38, including the services authorized for the remote unit, that the dialed digits represent a request for host 14 to initiate a transmission to remote unit 12. If the dialed digits request host 14 to initiate a transmission back, platform 34 requests a routing number corresponding to router 16 and remote unit 12 from router 16 via signaling network 40. This step is necessary so that host 14 can be informed how to route the transmission back to remote unit 12. In the case where remote unit 12 is a wireless unit, the routing number requested from router 16 is a temporary local directory number (TLDN). After router 16 transmits the requested routing number to platform 34, platform 34 sends a transmission request to host 14 via data network 42, the request including the routing number obtained from router 16. Host 14 then initiates a transmission to remote unit 12 using the routing number.

FIG. 11 also illustrates steps for enabling and disabling terminations at remote unit 12. If during registration platform 34 restricts transmission terminations to remote unit 12, as was described in connection with FIG. 2, platform 34 must enable remote unit 12 to receive transmissions before host 14 can initiate a transmission to remote unit 12. Once the transmission has been completed, host 14 notifies platform 34 via data network 42 that the transmission to remote unit 12 served by router 16 has been completed. Alternatively, IXC 28 may notify platform 34 via signaling interface 32 that the transmission has been completed. Platform 34 then transmits an instruction to router 16 via signaling network 40 to restrict terminations to remote unit 12 once again.

Figure 12:
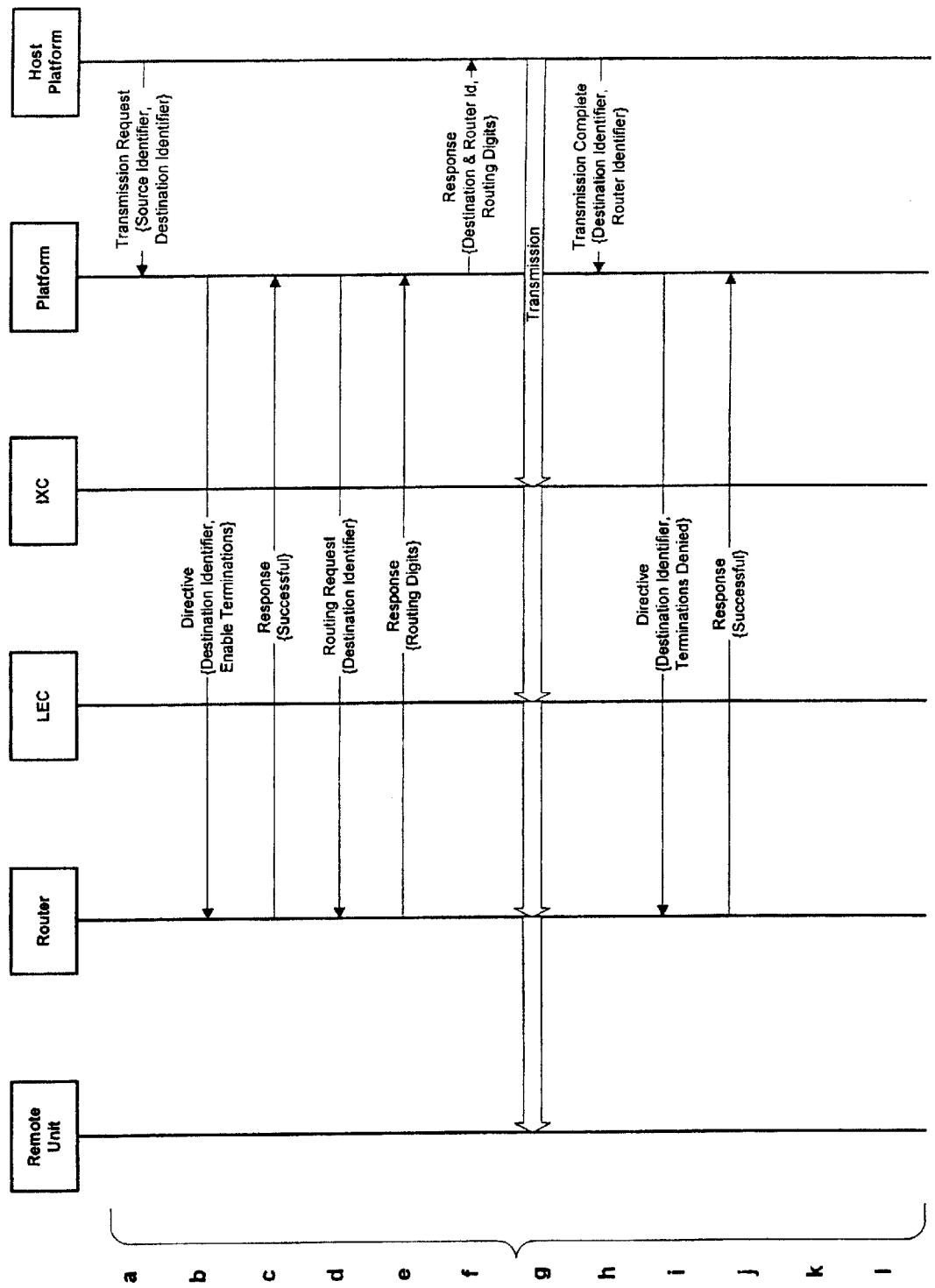
FIG. 12 is a flow diagram illustrating a method for authorizing and routing a transmission consistent with the present invention.

Consistent with the present invention, platform 34 also provides routing and authorization for transmissions from host 14 to remote unit 12. FIGS. 12–15 illustrate methods for routing and authorizing such fransmissions. The present invention addresses the problems of routing and authorization inherent in a wireless network in which remote units move from service area to service area. In FIG. 12, host 14 utilizes data network 42 to communicate with platform 34. Before initiating a transmission, host 14 transmits a request via data network 42 to platform 34 for a routing number corresponding to remote unit 12, the request including a remote unit identifier and host identifier. Platform 34 may determine whether host 14 is authorized to transmit to remote unit 12. If authorized, platform 34 determines the identifier of the last router known by platform 34 to have served remote unit 12. If autonomous registration is available, this identifier is the last registered router identifier for remote unit 12. Platform 34 transmits a request for a routing number to the router via signaling network 40. The router responds with a routing number corresponding to the router and remote unit, and platform 34 transmits this routing number to host 14 via data network 42. As described in connection with FIG. 11, the routing number may be a TLDN. Host 14 then initiates a transmission using the routing number. FIG. 12 also illustrates the enabling and disabling of terminations at remote unit 12 as was discussed in connection with FIG. 11.

Figure 13:
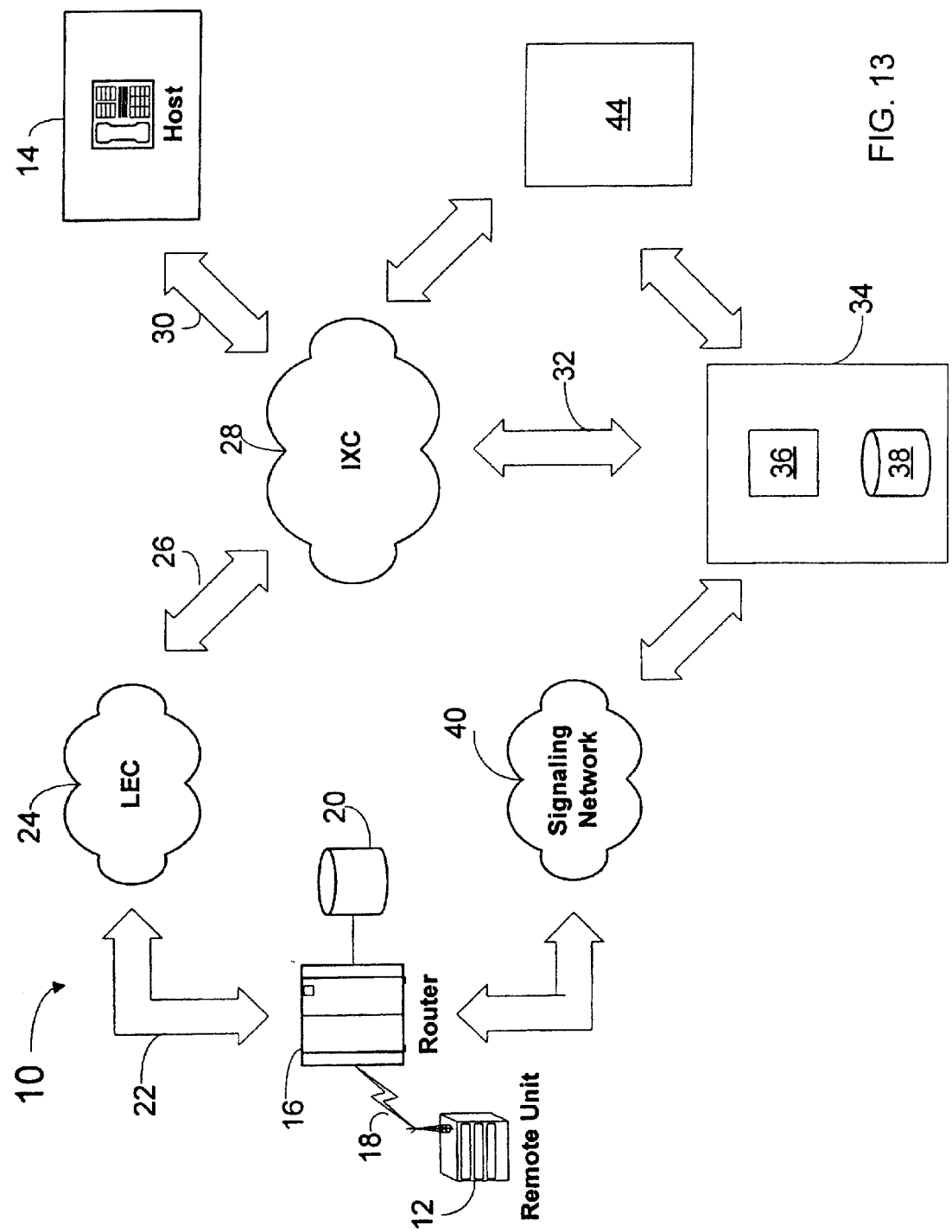
FIG. 13 is a high level block diagram of a network in which the authorization and routing scheme consistent with the present invention may be implemented.
Figure 14:
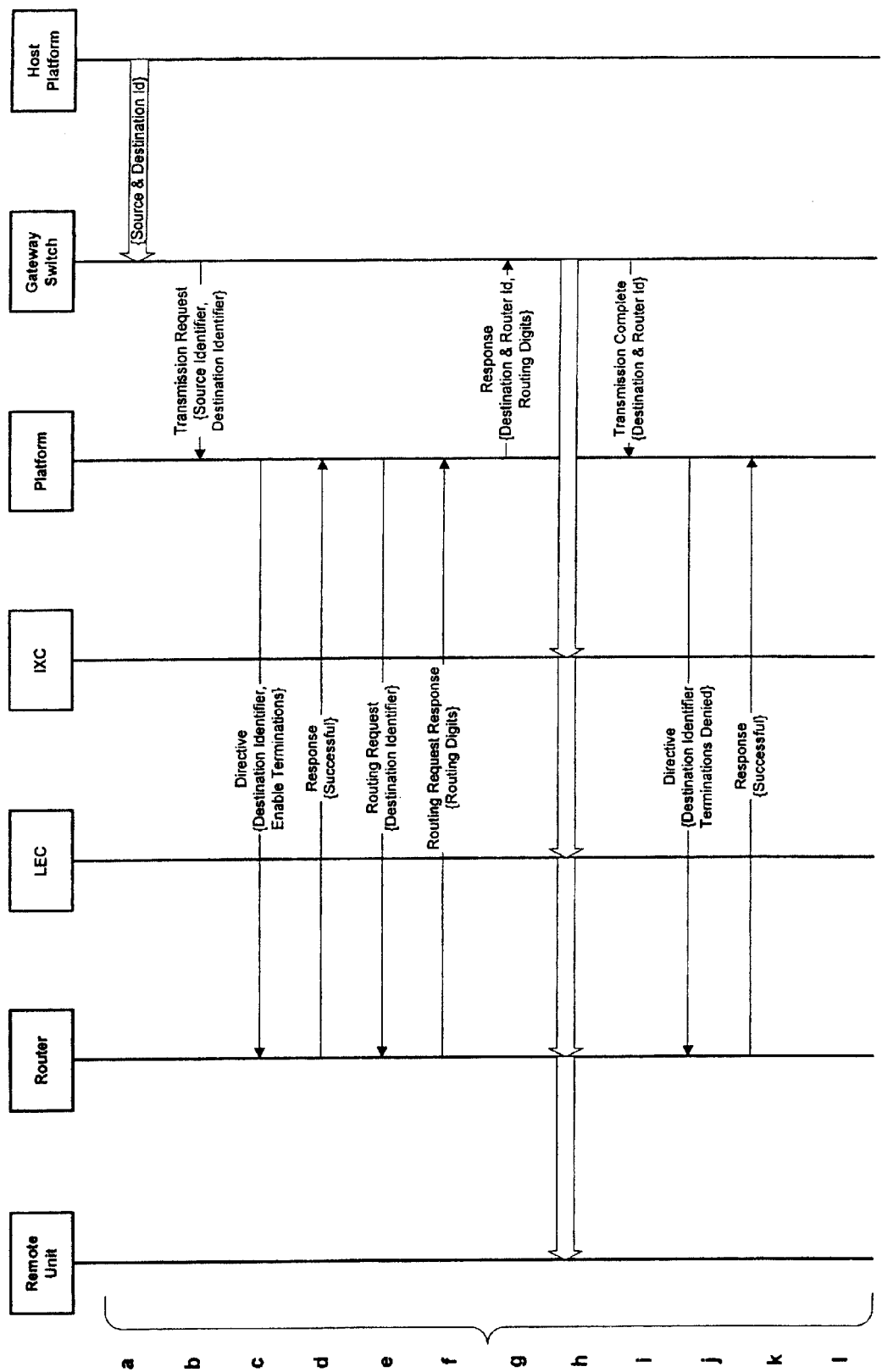
FIG. 14 is a flow diagram illustrating a method for authorizing and routing a transmission consistent with the present invention.

FIGS. 13 and 14 illustrate Another method for routing and authorizing a transmission from host 14 to remote unit 12 consistent with the present invention.

FIG. 13 illustrates gateway switch 44 in place of data network 42. Gateway switch 44 performs some of the functionality of data network 42 if host 14 does not have the capability to interface to date network 42. Gateway switch 44 may be part of platform 34 or a separate processor, but is shown as a separate network element for the sake of clarity. Gateway switch 44 interfaces to IXC 28 via a telecommunications interface. Gateway switch 44 interfaces to platform 34 via a data network interface.

As illustrated in FIG. 14, host 14 initiates a transmission to remote unit 12 by dialing a routing number corresponding to remote unit 12. Gateway switch 44 transmits a request for a routing number to platform 34 via the data network interface. The request includes identifiers for host 14 and remote unit 12. Transmission flow proceeds as in FIG. 12, platform 34 requesting a routing number from router 16, which may be a TLDN. However, when platform 34 receives the routing number, it transmits it to gateway switch 44, which has been holding the transmission. Gateway switch 44 then routes the transmission to router 16 via the telecommunications network using the routing number obtained from router 16. When the transmission is complete, gateway switch 44 notifies platform 34 so that terminations to remote unit 12 may be disabled.

Figure 15:
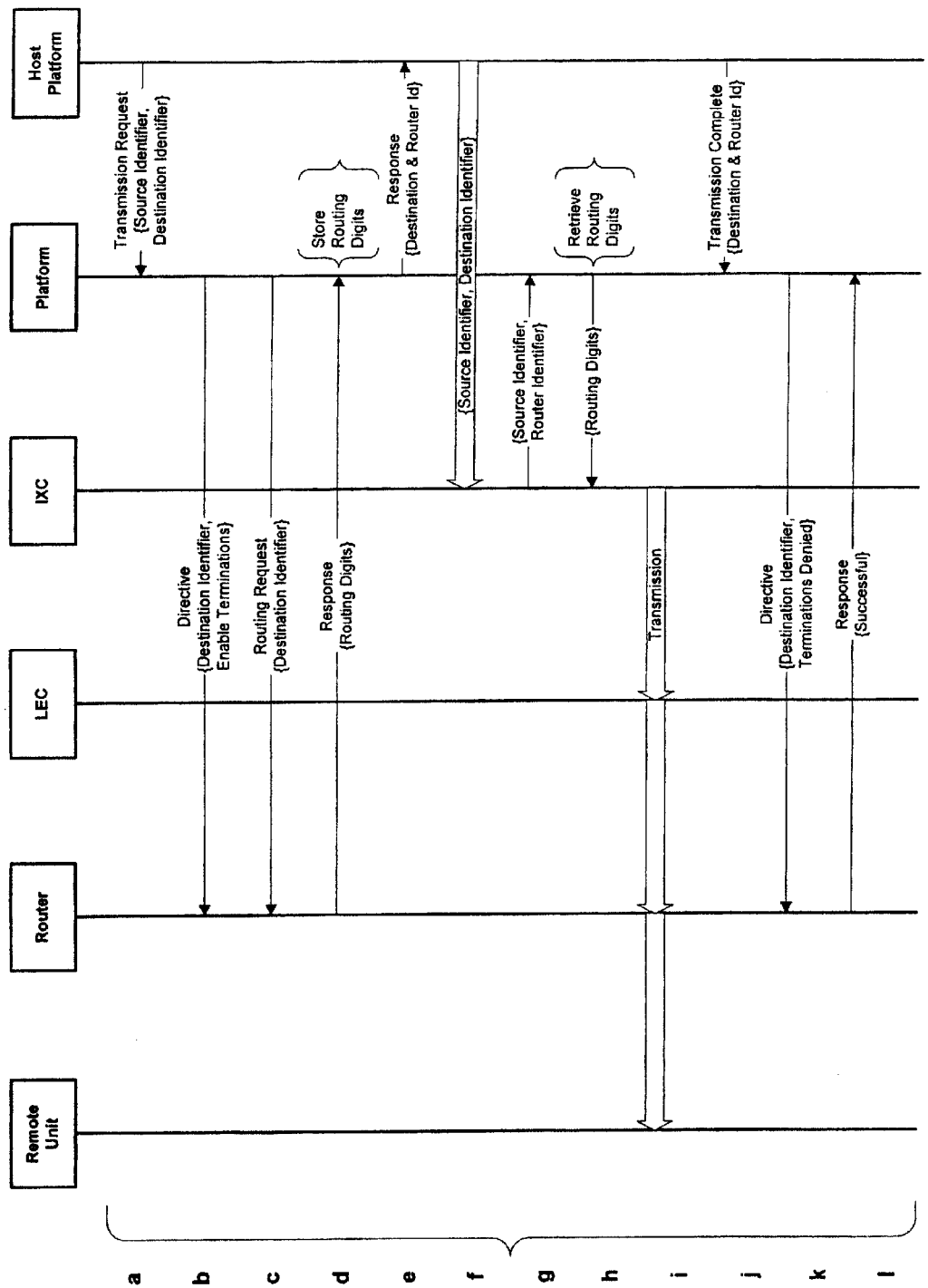
FIG. 15 a flow diagram illustrating another method for authorizing and routing a transmission consistent with the present invention.

FIG. 15 illustrates another alternative for routing and authorizing a transmission from host 14 to remote unit 12. In this scenario, host 14 sends a transmission request to platform 34, which obtains it from router 16, but instead of transmitting the routing number to host 14, platform 34 stores the routing number in its own database. Platform 34 then determines whether host 14 is authorized to transmit to remote unit 12. If the transmission is authorized, platform 34 signals host 14 via data network 42 that it may initiate the transmission. Host 14 initiates the transmission, transmitting a host identifier and remote unit identifier. IXC 28 requests routing instructions from platform 34 based on the remote unit identifier. Platform 34 returns to IXC 28 the routing number it previously obtained from router 16 and has been storing in its database. IXC 28 then completes the transmission.

Figure 16:
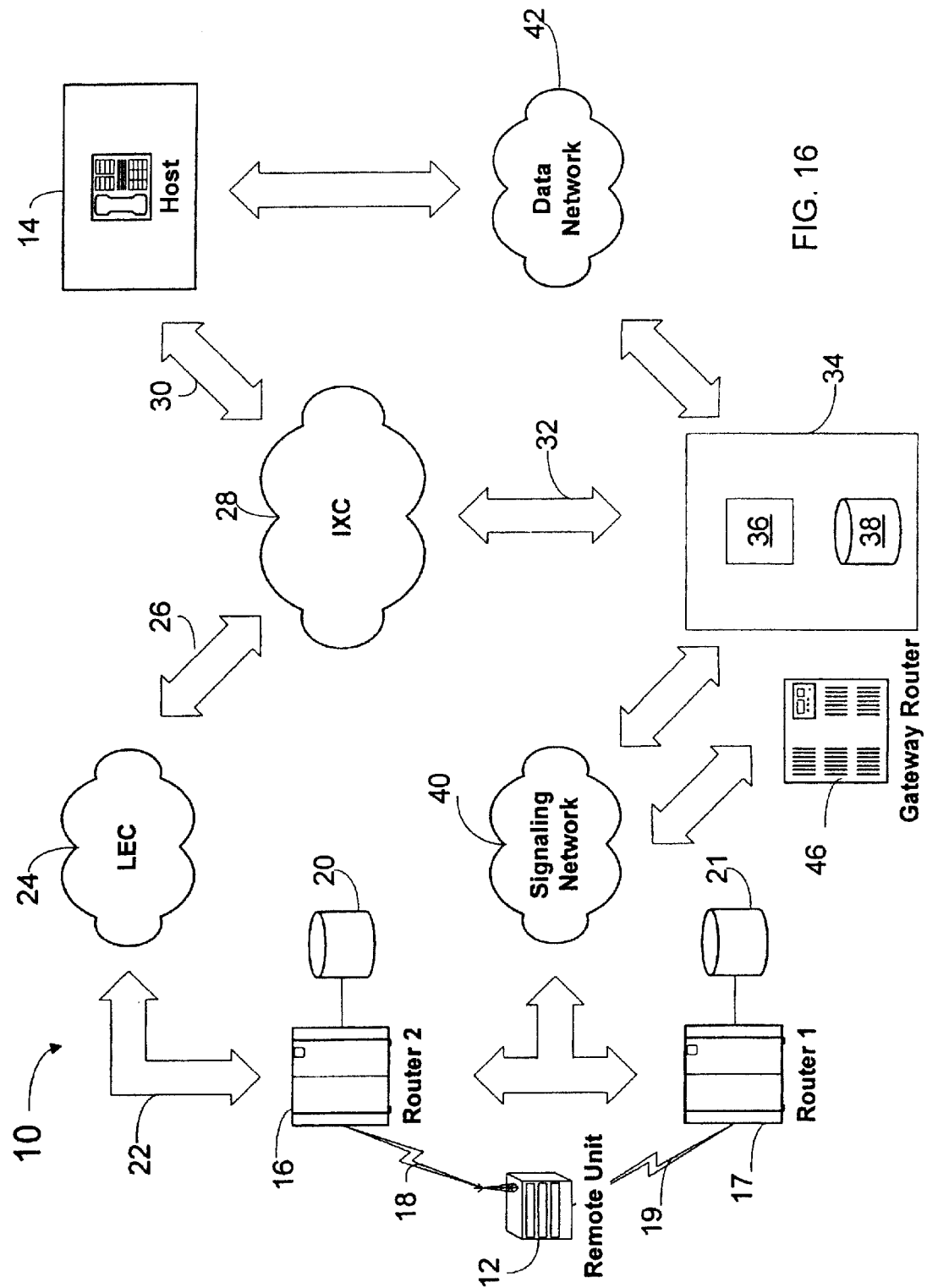
FIG. 16 is a high level block diagram of a network in which a scheme for directing a remote unit to register on a service consistent with the present invention may be implemented.
Figure 17:
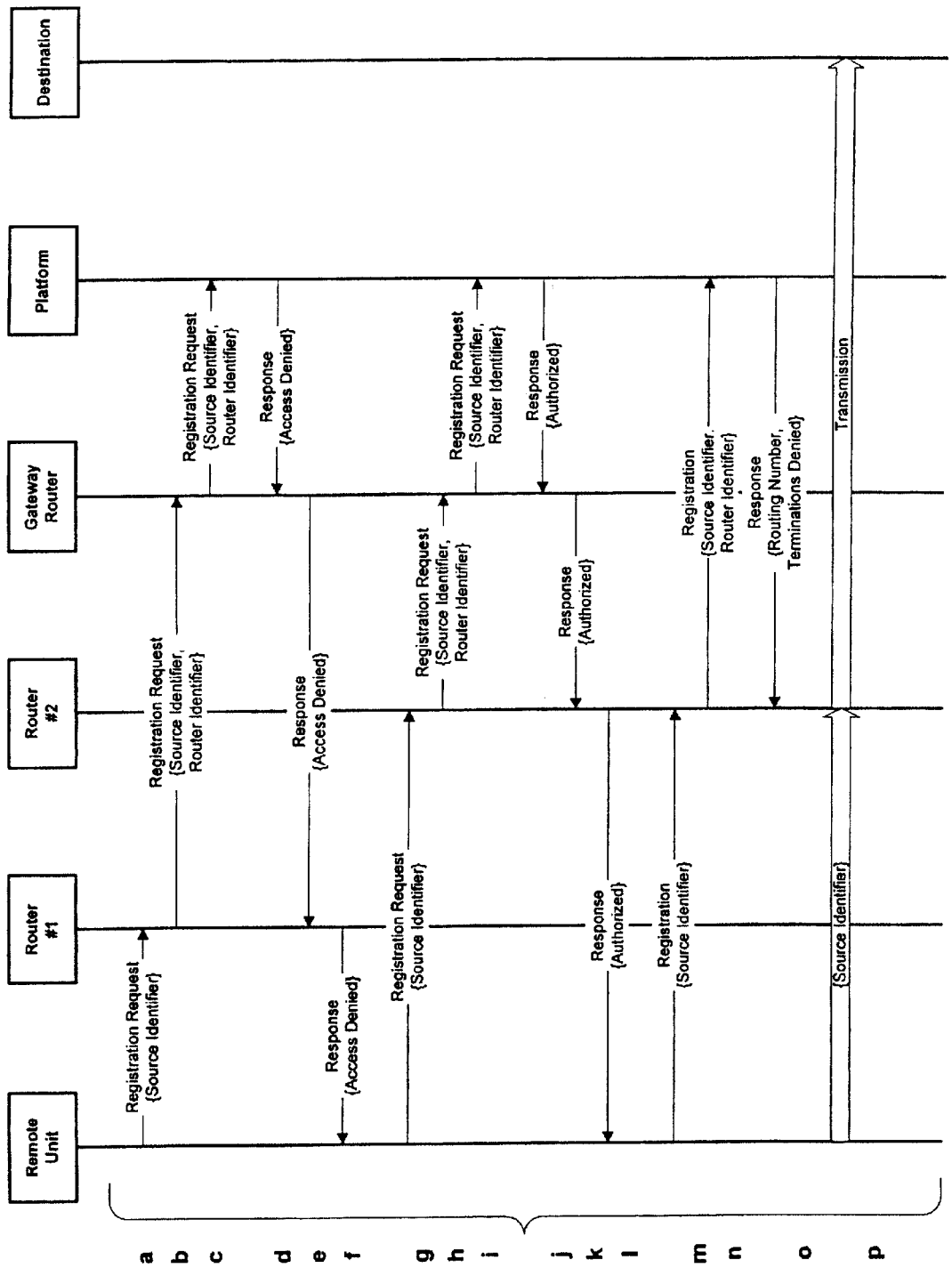
FIG. 17 is a flow diagram illustrating a method for directing a remote unit to register on a service consistent with the present invention.

Another function of platform 34 consistent with the present invention is the ability to direct remote unit 12 to register on a different service from the one on which it initially attempts to register. FIGS. 16 and 17 illustrate a method for redirecting service registration. In FIG. 16, two routers—16 and 17—are operated by two different service providers. Remote unit 12 can communicate with router 16 and router 17 via communications links 18 and 19, respectively. Routers 16 and 17 have associated databases 20 and 21, respectively, which may be part of the routers or separate entities. Routers 16 and 17 communicate with gateway router 46 via signaling network 40. As will be described in connection with FIG. 17, gateway router 46 interprets registration requests originated from remote unit 12 and communicates with platform 34 via a data interface, not specifically shown for the sake of clarity. Gateway router 46 may be part of platform 34 or a separate processor, but is shown as a separate entity for the sake of clarity.

FIG. 17 illustrates a method for selecting a service provider consistent with the present invention. Remote unit 12, which is a wireless device, transmits a request for registration to router 17. A registration request is provided, for example, in a Cellular Digital Packet Data (CDPD) network. In an implementation consistent with the present invention, routers 16 and 17 may implement both traditional cellular and CDPD service. However, the present invention is not limited to CDPD networks, so long as a registration request feature exists.

Upon receiving the registration request from remote unit 12, router 17 transmits the request to gateway router 46 via signaling network 40, the request including an identifier associated with remote unit 12 and an identifier associated with router 17. In a CDPD network environment, gateway router 46 may be a Mobile Data Intermediate System (MDIS) which can receive registration requests transmitted by routers 17 and 18. Gateway router 46 then sends a registration request to platform 34 via the data interface, which may be a proprietary interface. If the service provider operating router 17 is not a preferred provider, platform 34 transmits a response denying access to that provider. Platform 34 determines whether the service provider is preferred by searching database 38 for the remote unit identifier and the router identifier, which were passed with the registration request. Platform 34 may also consider the services authorized for the remote unit and the occurrence of timing events.

Upon receiving a denial of service from platform 34, gateway router 46 transmits the denial of service to router 17, which transmits it to remote unit 12. Remote unit 12 then attempts registration via router 19. The registration request is transmitted to platform 34 as before, and if platform 34 determines that the service provider operating router 19 is preferred, platform 34 transmits an authorization of service to gateway router 46 via the data interface. Gateway router 46 transmits the authorization of service to router 19, which transmits it to remote unit 12. Remote unit 12 then registers using router 19, the registration process identical to the one described in connection with FIG. 2.

It will be apparent to those skilled in this art that various modifications and variations can be made to the transmission authorization and routing scheme of the present invention without departing from the spirit and scope of the invention. Other embodiments of the invention will be apparent to those skilled in this art from consideration of the specification and practice of the invention disclosed herein. It is intended that the specification and examples be considered exemplary only, with the true scope and spirit of the invention being indicated by the following claims.

We claim:

1. A method for deriving a destination routing number for a transmission from a source having an associated identifier, wherein the source is served by a telecommunications router having an associated identifier, the method comprising the steps of:

transmitting the source identifier from the source to the telecommunications router;

transmitting the source identifier from the telecommunications router to a platform across a signaling network;

transmitting the source identifier from the telecommunications router to the platform across the signaling network;

determining, at the platform, the destination routing number, in response to the source identifier and the router identifier; and transmitting the destination routing number from the platform to the telecommunications router across the signaling network.

2. The method of claim 1 wherein the router identifier includes a location of the router.

3. The method of claim 1 wherein the source identifier includes a location of the source.

4. The method of claim 1 further comprising the step of:

transmitting from the platform to the router via the signaling network an instruction to restrict transmission terminations at the source.

5. A method for deriving a destination routing number for a transmission from a source having an associated identifier, wherein the source is served by a telecommunications router, the method comprising the steps of:

transmitting the source identifier from the source to the telecommunications router;

transmitting the source identifier from the telecommunications router to a platform across a signaling network, the platform including a database for storing services authorized for the source;

retrieving from the database the services authorized for the source;

determining, at the platform, the destination routing number in response to the source identifier and the services authorized for the source; and transmitting the destination routing number from the platform to the telecommunications router across the signaling network.

6. The method of claim 5 further comprising the steps of:

determining, at the platform, a second routing number corresponding to a second destination in response to a modification of the services authorized for the source; and transmitting the second destination routing number from the platform to the telecommunications router across the signaling network.

7. The method of claim 5 further comprising the steps of:

determining, at the platform, whether a change in availability of services for the source has occurred;

determining, at the platform, a second routing number corresponding to a second destination if there has been a change in availability of services for the source; and transmitting the second destination routing number from the platform to the telecommunications router across the signaling network.

8. The method of claim 5 further comprising the steps of:

determining, at the platform, a second routing number corresponding to a second destination in response to a timing event; and transmitting the second destination routing number from the platform to the telecommunications router across the signaling network.

9. A method for deriving a destination routing number for a transmission from a source having an associated identifier, wherein the source is served by a telecommunications router, the method comprising the steps of:

transmitting the source identifier from the source to the telecommunications router;

transmitting the source identifier from the telecommunications router to a platform across a signaling network;

determining, at the platform, the destination routing number in response to the source identifier and a timing event; and transmitting the destination routing number from the platform to the telecommunications router across the signaling network.

10. A method for routing a transmission from a source having an associated identifier, wherein the source is served-by a telecommunications router having an associated identifier, the method comprising the steps of:

transmitting the source identifier from the source to the telecommunications router;

transmitting the source identifier from the telecommunications router to a platform across a signaling network;

transmitting the router identifier from the telecommunications router to the platform across the signaling network;

determining, at the platform, a routing number corresponding to a destination in response to the source identifier and the router identifier;

transmitting the destination routing number from the platform to the telecommunications router across the signaling network;

receiving the transmission from the source at the telecommunications router; and routing the transmission to the destination across a telecommunications network using the destination routing number.

11. A method for routing a transmission from a source having an associated identifier, wherein the source is served by a telecommunications router having an associated identifier, the method comprising the steps of:

transmitting the source identifier from the source to the telecommunications router;

transmitting the source identifier from the telecommunications router to a platform across a signaling network, the platform including a database for storing services authorized for the source;

retrieving from the database the services authorized for the source;

determining, at the platform, the destination routing number in response to the source identifier and the services authorized for the source;

transmitting the destination routing number from the platform to the telecommunications router across the signaling network;

receiving the transmission from the source at the telecommunications router; and routing the transmission to the destination across a telecommunications network using the destination routing number.

12. A method for routing a transmission from a source having an associated identifier, wherein the source is served by a telecommunications-router having an associated identifier, the method comprising the steps of:

transmitting the source identifier from the source to the telecommunications router;

transmitting the source identifier from the telecommunications router to a platform across a signaling network;

determining, at the platform, the destination routing number in response to the source identifier and a timing event;

transmitting the destination routing number from the platform to the telecommunications router across the signaling network;

receiving the transmission from the source at the telecommunications router; and routing the transmission to the destination across a telecommunications network using the destination routing number.

13. A method for routing a transmission from a source having an associated identifier, wherein the source is served by a telecommunications router, the method comprising the steps of:

transmitting the source identifier from the source to the telecommunications router;

transmitting the source identifier from the telecommunications router to a platform across a signaling network;

transmitting from the platform to the telecommunications router across the signaling network a routing number corresponding to the platform;

routing the transmission from the source to the telecommunications router;

routing the transmission from the telecommunications router to a telecommunications network;

transmitting the source identifier from the source to the telecommunications router;

transmitting the source identifier from the telecommunications router to the telecommunications network;

transmitting the source identifier from the telecommunications network to the platform over a signaling interface;

determining at the platform the destination routing number, including the substep of:
  selecting the destination routing number based on the source identifier;

transmitting the routing number from the platform to the telecommunications network via the signaling interface; and routing the transmission to the destination via the telecommunications network using the destination routing number.

14. The method of claim 13 further comprising the step of:
transmitting from the platform to the router via the signaling network an instruction to restrict transmission terminations at the source.

15. The method of claim 13 wherein the router identifier includes a location of the router.

16. The method of claim 13 wherein the source identifier includes a location of the source.

17. The method of claim 13 wherein the router has air associated identifier, the method further comprising the steps of:

transmitting the router identifier from the telecommunications router to the telecommunications network; and transmitting the router identifier from the telecommunications network to the platform over a signaling interface;

and wherein the step of determining the destination routing number further-comprises the substep of:
  selecting the destination routing number based on the router identifier.

18. The method of claim 17 further comprising the step of:
transmitting from the platform to the router via the signaling network an instruction to restrict transmission terminations at the source.

19. The method of claim 13 wherein the platform includes a database for storing services authorized for the source, the method further comprising the step of:

retrieving from the platform database the services authorized for the source;

and wherein the step of determining the destination routing number further comprises the substep of:
  selecting the destination routing number based on the services authorized for the source.

20. The method of claim 13 wherein the step of determining the destination routing number further comprises the substep of:
selecting the destination routing number based on a timing event.

21. The method of claim 13 wherein the router has an associated identifier, the method further comprising the steps of:

transmitting the router identifier from the telecommunications router to the platform across the signaling network; and storing the router identifier in a database at the platform;

and wherein the step of determining the destination routing number further comprises the substep of:
  selecting the destination routing number based on the router identifier stored in the platform database.

22. A method for deriving a destination routing number for a transmission from a source having an associated identifier, wherein the source is served by a telecommunications router having an associated identifier, the method comprising the steps of:

receiving the source identifier at a platform;

receiving the router identifier at the platform;

storing the router identifier in a database at the platform;

routing the transmission from the source to the telecommunications router;

routing the transmission from the telecommunications router to a telecommunications network;

determining at the platform the destination routing number based on the source identifier and the router identifier stored in the database.

23. The method of claim 22 further comprising the steps of:

transmitting the source identifier from the source to the telecommunications router;

transmitting the source identifier from the telecommunications router to the platform via a signaling network; and transmitting the router identifier from the telecommunications router to the platform via the signaling network.

24. The method of claim 22 further comprising the steps of:

transmitting the source identifier from the source to the telecommunications router;

transmitting the source identifier from the telecommunications router to the telecommunications network;

transmitting the router identifier from the telecommunications router to the telecommunications network;

transmitting the source identifier from the telecommunications network to the platform via a signaling interface; and transmitting the router identifier from the telecommunications network to the platform via the signaling interface.

25. A method for routing a transmission from a source, wherein the source is served by a telecommunications router coupled to a database, and wherein the source has an associated identifier, the method comprising the steps of:

transmitting the source identifier from the source to the telecommunications router;

receiving the transmission at the telecommunications router;

obtaining from the router database in response to the source identifier a routing number corresponding to a platform;

routing the transmission from the source to the telecommunications router;

routing the transmission from the telecommunications router to a telecommunications network;

transmitting the source identifier from the telecommunications router to the telecommunications network;

transmitting the source identifier from the telecommunications network to the platform over a signaling interface;

determining at the platform the destination routing number, comprising the substep of:
selecting the destination routing number based on the source identifier;

transmitting the routing number from the platform to the telecommunications network via the signaling interface; and routing the transmission to the destination via the telecommunications network using the destination routing number.

26. The method of claim 25 wherein the router has an associated identifier, the method further comprising the step of:

transmitting the router identifier from the telecommunications network to the platform over the signaling interface;

and wherein the step of determining the destination routing number further comprises the substep of:
selecting the destination routing number based on the router identifier.

27. The method of claim 26 further comprising the step of:
transmitting from the platform to the router, in response to the source identifier and the router identifier, an instruction to restrict transmissions from the source.

28. The method of claim 26 further comprising the step of:
transmitting from the platform to the telecommunications network, in response to the source identifier and the router identifier, a routing number corresponding to a second destination.

29. The method of claim 26 further comprising the step of:
transmitting from the platform to the telecommunications network an instruction to end the transmission.

30. The method of 25, wherein the platform includes a database for storing services authorized for the source, the method further comprising the step of:
retrieving from the platform database the services authorized for the source; and wherein the step of determining the destination routing number further comprises the substep of:
selecting the destination routing number based on the services authorized for the source.

31. The method of claim 25, wherein the step of determining the destination routing number further comprises the substep of:
selecting the destination routing number based on a timing event.

32. A method for authorizing and routing a transmission from a source having an associated identifier, wherein the source is served by a telecommunications router, and wherein the source has dialed a set of digits, the method comprising the steps of:
transmitting the source identifier from the source to the telecommunications router;

transmitting the set of digits dialed by the source from the source to the telecommunications router;

transmitting the source identifier from the telecommunications router to a platform via a signaling network, the platform including a database for storing services authorized for the source;

transmitting the set of digits dialed by the source from the telecommunications router to the platform via the signaling network; and determining at the platform whether the set of digits corresponds to a destination, the step of determining comprising the substeps of:
searching in the platform database for the source identifier; and
searching in the platform database for the services authorized for the source.

33. The method of claim 32 firther comprising the step of:
transmitting from the platform to the router via the signaling network a routing number corresponding to the destination if the set of digits dialed by the source correspond to a destination.

34. The method of claim 32 further comprising the step of:
determining at the platform, if the set of digits corresponds to a destination, whether the source is authorized to transmit to the destination, the step of determining comprising the substeps of:
searching in the platform database for the source identifier; and
searching in the platform database for the set of digits corresponding to the destination.

35. The method of claim 34 wherein the router has an associated identifier, the method further comprising the step of:

transmitting the router identifier from the router to the platform via the signaling network;

and wherein the step of determining whether the source is authorized to transmit to the destination further comprises the substep of:
searching in the platform database for the router identifier.

36. The method of claim 34 wherein the platform includes a database for storing services authorized for the source, the method further comprising the step of:
retrieving from the platform database the services authorized for the source;

and wherein the step of determining whether the source is authorized to transmit to the destination further comprises the substep of:
searching in the platform database for the services authorized for the source.

37. The method of claim 34 wherein the step of determining whether the source is authorized to transmit to the destination further comprises the substep of:
searching in the platform database for a timing event.

38. A method for authorizing and routing a transmission from a source having an associated identifier, wherein the source is served by a telecommunications router, and wherein the source has dialed a set of digits, the method comprising the steps of:
transmitting the source identifier from the source to the telecommunications router;

transmitting the set of digits dialed by the source from the source to the telecommunications router;

transmitting the source identifier from the telecommunications router to a platform via a signaling network, the platform including a database for storing services authorized for the source;

transmitting the set of digits dialed by the source from the telecommunications router to the platform via the signaling network;

determining at the platform whether the set of digits corresponds to a trigger for an event, the step of determining comprising the substeps of:

searching in the platform database for the source identifier; and searching in the platform database for the services authorized for the source.

39. The method of claim 38 further comprising the step of:

determining at the platform whether the event corresponding to the set of digits dialed by the source is authorized, including the substep of:

searching in the platform database for the source identifier.

40. The method of claim 39 wherein the router has an associated identifier, the method further comprising the step of:

transmitting the router identifier from the router to the platform via the signaling network;

and wherein the step of determining whether the event is authorized further comprises the substep of:

searching in the platform database for the router identifier.

41. The method of claim 39 further comprising the step of:

retrieving from the platform database the services authorized for the source;

and wherein the step of determining whether the event is authorized further comprises the substep of:

searching in the platform database for the services authorized for the source.

42. The method of claim 39 wherein the step of determining whether the source is authorized to transmit to the destination further comprises the substep of:

searching in the platform database for a timing event.

43. The method of claim 38 further comprising the step of:

triggering the event identified by the-set of digits dialed by the source.

44. The method of claim 43 further comprising the steps of:

determining at the platform a routing number corresponding to a destination in response to the set of digits dialed by the source; and transmitting the destination routing number from the platform to the router via the signaling network.

45. A method for authorizing and routing a transmission from a source having an associated identifier, wherein the source is served by a telecommunications router, and wherein the source has dialed a set of digits, the method comprising the steps of:

transmitting the source identifier from the source to the telecommunications router;

transmitting the set of digits dialed by the source from the source to the telecommunications router;

transmitting the source identifier from the telecommunications router to a platform via a signaling network, the platform including a database for storing services authorized for the source;

transmitting the set of digits dialed by the source from the telecommunications router to the platform via the signaling network; and determining at the platform whether to store the set of digits at the platform, the step of determining comprising the substeps of:

searching in the platform database for the source identifier; and searching in the platform database for the services authorized for the source.

46. The method of claim 45 further comprising the step of:

storing the set of digits at the platform.

47. The method of claim 46 further comprising the steps of:

receiving at the platform, via a data network, an instruction from a destination to forward the set of digits to the destination; and forwarding the set of digits to the destination via the data network.

48. The method of claim 45 further comprising the steps of:

determining at the platform whether to forward the set of digits stored at the platform to a destination, the step of determining comprising the substeps of:

searching in the platform database for the source identifier; and searching in the platform database for the services authorized for the source;

identifying the destination to which the set of digits should be forwarded, including the substep of:

searching in the platform database for the source identifier; and forwarding the set of digits to the destination via a data network.

49. A method for authorizing and routing a transmission from a source having an associated identifier, wherein the source is served by a telecommunications router, and wherein the source has dialed a set of digits, the method comprising the steps of:

transmitting the source identifier from the source to the telecommunications router;

transmitting the set of digits dialed by the source from the source to the telecommunications router;

transmitting the source identifier from the telecommunications router to a platform via a signaling network, the platform including a database for storing services authorized for the source;

transmitting the set of digits dialed by the source from the telecommunications router to the platform via the signaling network;

determining at the platform whether to signal a host to initiate a second transmission to the source, the step of determining comprising the substeps of:

searching in the platform database for the source identifier; and searching in the platform database for the services authorized for the source;

transmitting via the signaling network a request from the platform to the router for a routing number corresponding to the source;

receiving at the platform from the router via the signaling network the source routing number;

signaling the host via a data network to initiate the second transmission to the source.

50. The method of claim 49 wherein the step of signaling the host includes the substep of:

transmitting the source routing number from the platform to the host via the data network.

51. The method of claim 49 wherein the step of signaling the host includes the substep of:

transmitting the source identifier from the platform to the host via the data network.

52. A Method for routing a transmission from a source to a destination comprising the steps of:
   transmitting from the source to a platform via a data network a request for a routing number corresponding to the destination, the request including an identifier associated with the source and an identifier associated with the destination;
   determining at the platform a telecommunications router that serves the destination;
   determining at the platform whether the source is authorized to transmit to the destination, the step of determining comprising the substeps of:
      searching in the platform database for the source identifier; and
      searching in the platform database for the destination identifier;
   transmitting from the platform to the telecommunications router via a signaling network the request for a routing number;
   determining at the telecommunications router a routing number corresponding to the router serving the destination;
   transmitting the routing number from the telecommunications router to the platform via the signaling network;
   transmitting the routing number from the platform to the source via the data network;
   routing the transmission from the source to the telecommunications router via the telecommunications network using the routing number; and
   routing the transmission from the telecommunications router to the destination.

53. The method of claim 52 wherein the platform includes a database for storing services authorized for the source, the method further comprising the step of:
   retrieving from the platform database the services authorized for the source;
   and wherein the step of determining whether the source is authorized to transmit to the destination further comprises the substep of:
      searching in the platform database for the services authorized for the source.

54. The method of claim 52 wherein the step of determining whether the source is authorized to transmit to the destination further comprises the substep of:
   searching in the platform database for a timing event.

55. The method of claim 52 further comprising the step of:
   transmitting an instruction from the platform to the router via the signaling network to enable the destination to receive transmissions before the step of sending the transmission from the source to the router.

56. The method of claim 52 further comprising the steps of:
   transmitting from the source to the platform via the data network a message indicating the transmission has been completed; and
   transmitting an instruction from the platform to the router via the signaling network to restrict transmission terminations at the destination, in response to the message received at the platform from the source.

57. A method for routing a transmission from a source to a destination comprising the steps of:
   initiating the transmission at the source by dialing a routing number corresponding to the destination;
   routing the transmission to a gateway switch via a telecommunications network;
   transmitting from the gateway switch to a platform a request for a routing number corresponding to the destination, the request including an identifier associated with the source and an identifier associated with the destination;
   determining at the platform a telecommunications router that serves the destination;
   transmitting from the platform to the telecommunications router via a signaling network the request for a routing number;
   determining at the platform whether the source is authorized to transmit to the destination, the step of determining comprising the substeps of:
      searching in the platform database for the source identifier; and
      searching in the platform database for the destination identifier;
   determining at the telecommunications router a routing number corresponding to the router serving the destination;
   transmitting the routing number from the telecommunications router to the platform via the signaling network;
   transmitting the routing number from the platform to the gateway switch via a data network;
   routing the transmission from the gateway switch to the telecommunications router via the telecommunications network using the routing number; and
   routing the transmission from the telecommunications router to the destination.

58. The method of claim 57 wherein the platform includes a database for storing services authorized for the source, the method further comprising the step of:
   retrieving from the platform database the services authorized for the source;
   and wherein the step of determining whether the source is authorized to transmit to the destination further comprises the substep of:
      searching in the platform database for the services authorized for the source.

59. The method of claim 57 wherein the step of determining whether the source is authorized to transmit to the destination further comprises the substep of:
   searching in the platform database for a timing event.

60. The method of claim 57 further comprising the step of:
   transmitting an instruction from the platform to the router via the signaling network to enable the destination to receive transmissions before the step of sending the transmission from the gateway switch to the router.

61. The method of claim 57 further comprising the steps of:
   transmitting from the gateway switch to the platform via the data network a message indicating the transmission has been completed; and
   transmitting an instruction from the platform to the router via the signaling network to restrict transmission terminations at the destination, in response to the message received at the gateway switch from the source.

62. A method for routing a transmission from a source to a destination comprising the steps of:
   transmitting from the source to a platform via a data network a request to transmit to the destination, the request including an identifier associated with the source and an identifier associated with the destination;
   determining at the platform a telecommunications router that serves the destination;

transmitting from the platform to the telecommunications router via a signaling network the request for a routing number;

determining at the platform whether the source is authorized to transmit to the destination, the step of determining comprising the substeps of:
  searching in the platform database for the source identifier; and
  searching in the platform database for the destination identifier;

determining at the telecommunications router a routing number corresponding to the router serving the destination;

transmitting the routing number from the telecommunications router to the platform via the signaling network;

storing the routing number at the platform;

transmitting via the data network a signal from the platform to the source to initiate the transmission;

initiating the transmission from the source by dialing an identifier associated with the destination;

routing the transmission from the source to a telecommunications network;

transmitting from the source to the telecommunications network the destination identifier dialed by the source;

transmitting from the source to the telecommunications network the source identifier;

transmitting from the telecommunications network to the platform via a signaling interface the destination identifier dialed by the source and the source identifier;

determining at the platform whether the source is authorized to transmit to the destination;

retrieving the stored routing number;

transmitting the routing number from the platform to the telecommunications network if the source is authorized to transmit;

routing the transmission from the telecommunications network to the telecommunications router using the routing number; and routing the transmission from the telecommunications router to the destination.

63. A method for selecting a wireless carrier for routing a transmission from a remote unit having an associated identifier, the method comprising the steps of:
  transmitting a first request for registration of the remote unit from the remote unit to a first telecommunications router having an associated identifier, the first request including the remote unit identifier;
  transmitting the first request for registration of the remote unit from the first telecommunications router to a gateway router via a signaling network, the first request further including the router identifier;
  transmitting the first request for registration of the remote unit from the gateway router to a platform via a data interface;
  determining at the platform whether the first telecommunications router is operated by a preferred service provider, the step of determining comprising the substeps of:
    searching in the platform database for the remote unit identifier; and
    searching in the platform database for the first telecommunications router identifier;
  transmitting a denial of service from the platform to the gateway router via the data network if the first telecommunications router is not operated by a preferred service provider;
  transmitting the denial of service from the gateway router to the first telecommunications router via the signaling network; and
  transmitting the denial of service from the first telecommunications router to the remote unit.

64. The method of claim 63, wherein the platform includes a database for storing services authorized for the remote unit, the method further comprising the step of:
  retrieving from the platform database the services authorized for the remote unit;
and wherein the step of determining whether the first telecommunications router is operated by a preferred service provider further comprises the substep of:
  searching in the platform database for the services authorized for the remote unit.

65. The method of claim 63 wherein the step of determining whether the first telecommunications router is operated by a preferred service provider further comprises the substep of:
  considering an occurrence of a timing event.

66. The method of claim 63 further comprising the steps of:
  transmitting a second request for registration from the remote unit to a second telecommunications router;
  transmitting the second request for registration of the remote unit from the second telecommunications router to a gateway router via a signaling network, the second request further including the second router identifier;
  transmitting the second request for registration of the remote unit from the gateway router to the platform via a data interface;
  determining at the platform whether the second telecommunications router is operated by a preferred service provider, the step of determining comprising the substeps of:
    searching in the platform database for the remote unit identifier; and
    searching in the platform database for the second telecommunications router identifier;
  transmitting an authorization of service from the platform to the gateway router via the data network if the second telecommunications router is operated by a preferred service provider;
  transmitting the authorization of service from the gateway router to the second telecommunications router via the signaling network; and
  transmitting the authorization of service from the second telecommunications router to the remote unit.

67. The method of claim 66 further comprising the step of initiating registration from the remote unit in response to the remote unit receiving the authorization of service.

68. The method of claim 66 wherein the step of determining whether the second telecommunications router is operated by a preferred service provider further comprises the substep of:
  searching in the platform database for the services authorized for the remote unit.

69. The method of claim 66 wherein the step of determining whether the second telecommunications router is operated by a preferred service provider further comprises the substep of:
  considering an occurrence of a timing event.

70. In a telecommunications network, a system for authorizing and routing transmissions from a source having an associated identifier, wherein the source is served by a telecommunications router having an associated identifier, wherein the telecommunications router includes means for receiving the source identifier, the system comprising:

means for receiving the source identifier from the router;

means for receiving the router identifier from the router;

a database for storing a routing number for a destination;

a processor for obtaining from the database the destination routing number corresponding to the source identifier and the router identifier; and means for transmitting the destination routing number to the router across a signaling network.

71. In a telecommunications network, a system for authorizing and routing transmissions from a source having an associated identifier, wherein the source is served by a telecommunications router including means for receiving the source identifier, the system comprising:

means for receiving the source identifier from the router;

database for storing a routing number for a destination and a set of set of services authorized for the source;

a processor for obtaining from the database the destination routing number corresponding to the source identifier and the set of services authorized for the source; and means for transmitting the destination routing number to the router across a signaling network.

72. In a telecommunications network, a system for authorizing and routing transmissions from a source having an associated identifier, wherein the source has dialed a set of digits, and wherein the source is served by a telecommunications router including means for receiving the source identifier and means for receiving the set of dialed digits from the source, the system comprising:

means for receiving the source identifier from the router;

means for receiving the set of dialed digits from the router;

a database for storing a set of services authorized for the source;

a processor for determining whether the set of dialed digits corresponds to a destination based on the source identifier and the set of services authorized for the source; and means for determining whether the set of dialed digits correspond to an event trigger based on the source identifier and the set of services authorized for the source.

73. The system of claim 72 further comprising:

means for determining whether the source is authorized to transmit to the destination.

74. The system of claim 72 further comprising:

means for storing the set of dialed digits; and means for forwarding the set of dialed digits to a host destination.

\* \* \* \* \*